United States Patent
Kondou et al.

(10) Patent No.: US 8,271,176 B2
(45) Date of Patent: Sep. 18, 2012

(54) DRIVING SUPPORT DEVICE, DRIVING SUPPORT METHOD, AND DRIVING SUPPORT PROGRAM

(75) Inventors: Yoshito Kondou, Anjo (JP); Takayuki Miyajima, Anjo (JP); Shiho Ishibashi, Okazaki (JP)

(73) Assignee: Aisin AW Co., Ltd. (JP)

( * ) Notice: Subject to any disclaimer, the term of this patent is extended or adjusted under 35 U.S.C. 154(b) by 464 days.

(21) Appl. No.: 12/407,488

(22) Filed: Mar. 19, 2009

(65) Prior Publication Data

US 2009/0265072 A1   Oct. 22, 2009

(30) Foreign Application Priority Data

Apr. 22, 2008   (JP) ................. 2008-111086

(51) Int. Cl.
*G06G 7/76* (2006.01)
(52) U.S. Cl. .......................................... 701/72
(58) Field of Classification Search ............ 701/70, 701/71, 72
See application file for complete search history.

(56) References Cited

U.S. PATENT DOCUMENTS

| | | | |
|---|---|---|---|
| 5,742,507 A * | 4/1998 | Eckert ........................ | 701/70 |
| 6,778,896 B1 * | 8/2004 | Matsuura et al. ............. | 701/70 |
| 7,337,055 B2 * | 2/2008 | Matsumoto et al. ........... | 701/93 |
| 2006/0190158 A1 | 8/2006 | Shiiba et al. .................. | 701/70 |
| 2007/0106445 A1 | 5/2007 | Suzuki et al. ................. | 701/70 |

FOREIGN PATENT DOCUMENTS

| | | |
|---|---|---|
| JP | 09-050597 | 2/1997 |
| JP | 2005-076673 | 3/2005 |
| JP | 2006-282136 | 10/2006 |
| JP | 2007-253858 | 10/2007 |
| JP | 2008-087562 | 4/2008 |
| WO | WO 2007/129173 | 11/2007 |

* cited by examiner

*Primary Examiner* — Kevin Hurley
(74) *Attorney, Agent, or Firm* — Bacon and Thomas, PLLC

(57) ABSTRACT

An end point of a reference speed zone is obtained in which a host vehicle travels at a reference speed by controlling an adjustment amount of a drive source output of the host vehicle, without applying a preset correspondence relation regarding an accelerator pedal position and the adjustment amount of the drive source output of the host vehicle. After the host vehicle passes the end point of the reference speed zone, the adjustment amount is changed by a first degree of change if an actual adjustment amount and an adjustment amount corresponding to application of the correspondence relation with the accelerator pedal position do not coincide.

11 Claims, 12 Drawing Sheets

Ca – Rs: DECELERATION ZONE Zd
Rs – Re: CONSTANT-R CURVE ZONE Zr
Rs – P₀: REFERENCE SPEED ZONE Zb

FIG. 13

| | CONTROL STATE: 0 (ACCELERATOR OPENING ≤ THROTTLE OPENING) | CONTROL STATE: 1 (ap < PREDETERMINED VALUE AND/OR COINCIDENCE FLAG = 0) | CONTROL STATE: 2 (ap ≥ PREDETERMINED VALUE AND COINCIDENCE FLAG = 1) |
|---|---|---|---|
| CURRENT LOCATION STATE: 1 (POINT $P_0$ – POINT $P_1$) | APPLY CORRESPONDENCE RELATION OF FIG. 3 | INCREASE THROTTLE OPENING BY th1 | INCREASE THROTTLE OPENING BY th2 |
| CURRENT LOCATION STATE: 2 (POINT $P_1$ – POINT $P_2$) | APPLY CORRESPONDENCE RELATION OF FIG. 3 | INCREASE THROTTLE OPENING BY th2 | INCREASE THROTTLE OPENING BY th2 |
| CURRENT LOCATION STATE: 3 (POINT $P_2$ ONWARD) | APPLY CORRESPONDENCE RELATION OF FIG. 3 | INCREASE THROTTLE OPENING BY th2 | INCREASE THROTTLE OPENING BY th2 |

FIG. 14

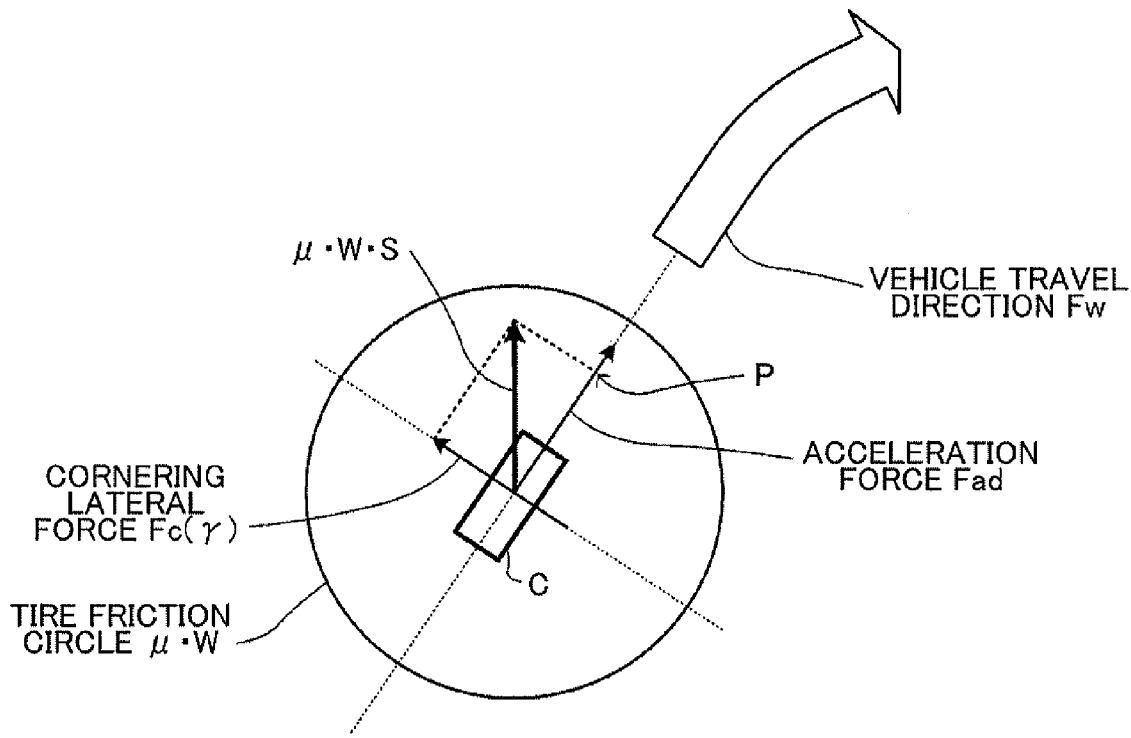

F I G. 15A
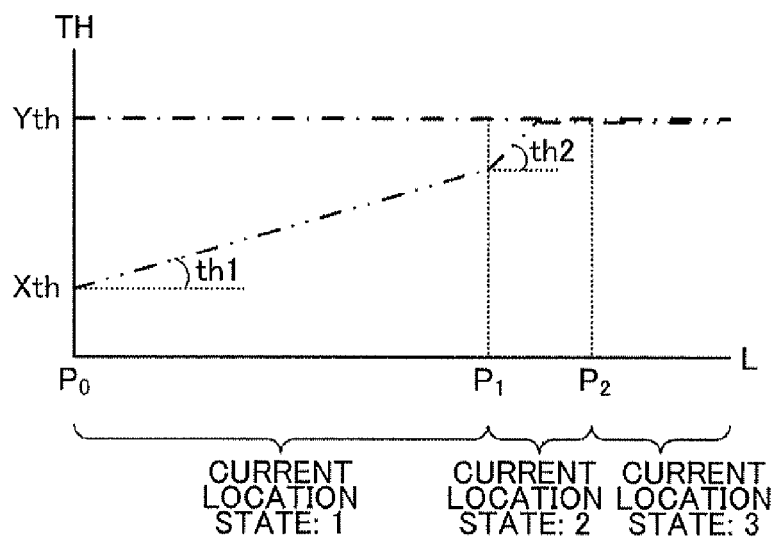
F I G. 15B
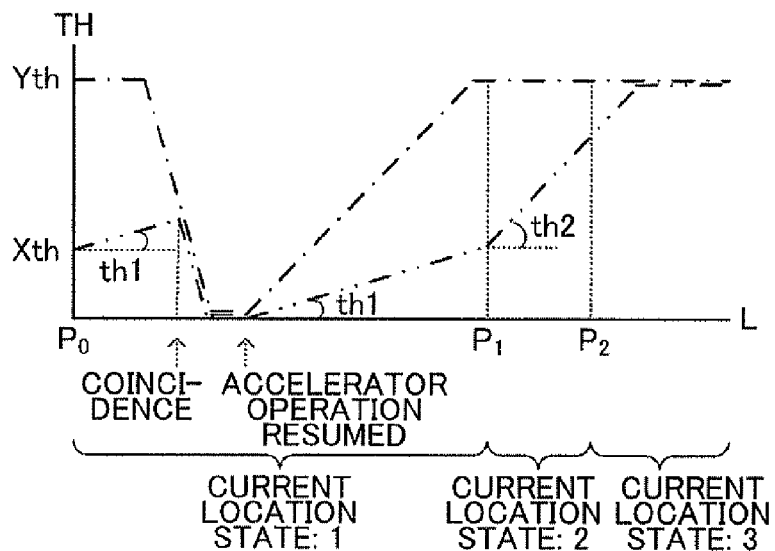
F I G. 15C
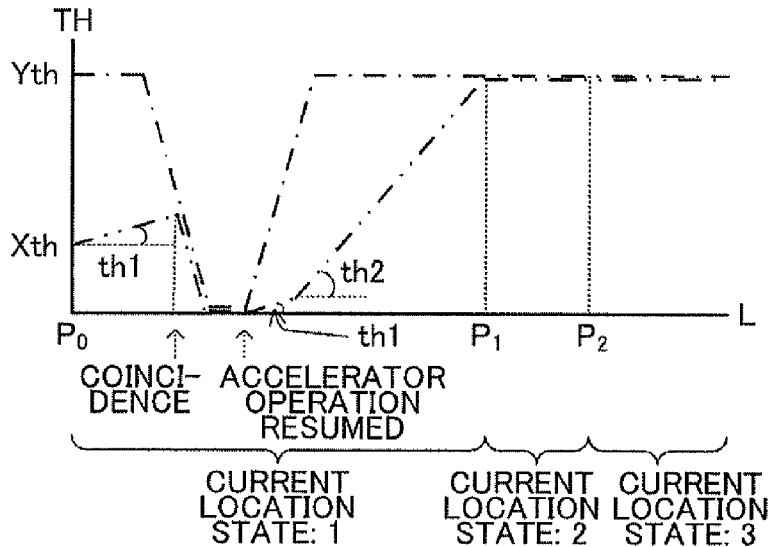

DRIVING SUPPORT DEVICE, DRIVING SUPPORT METHOD, AND DRIVING SUPPORT PROGRAM

INCORPORATION BY REFERENCE

The disclosure of Japanese Patent Application No. 2008-111086 filed on Apr. 22, 2008 including the specification, drawings and abstract is incorporated herein by reference in its entirety.

BACKGROUND OF THE INVENTION

The present invention relates to a driving support device, a driving support method, and a driving support program which support the driving of a vehicle.

DESCRIPTION OF THE RELATED ART

In known related art (Japanese Patent Application Publication No. JP-A-H09-050597, for example), when a driver performs the operation of depressing an accelerator pedal, a throttle control (a control that varies a throttle opening regardless of a preset correspondence relation between the throttle opening and an accelerator pedal position) is performed to adjust a vehicle speed.

SUMMARY OF THE INVENTION

In the related art, canceling the throttle control in a state where the actual throttle opening with respect to the accelerator pedal position differs from the throttle opening based on the preset correspondence relation resulted in a sense of incongruity for the driver. In other words, when an output control of a drive source such as the throttle control is canceled, the driver may feel that the vehicle behavior predicted from an amount by which the driver is depressing the accelerator pedal does not smoothly match the actual vehicle behavior. More specifically, for example, when a throttle control that reduces the actual throttle opening with respect to the accelerator pedal position more than the throttle opening based on the correspondence relation is canceled, the driver experiences a sense of sudden acceleration even though the driver has not changed the depression amount of the accelerator pedal. As a consequence, the driver feels a sense of incongruity.

The present invention was devised in light of the foregoing problem, and it is an object of the present invention to provide art that lessens a driver's sense of incongruity when an output control of a drive source is ended.

To achieve the above object, in the present invention an end point of a reference speed zone is obtained in which a host vehicle travels at a reference speed by controlling an adjustment amount of a drive source output of the host vehicle, without applying a preset correspondence relation regarding an accelerator pedal position and the adjustment amount of the drive source output of the host vehicle. After the host vehicle passes the end point of the reference speed zone, the adjustment amount is changed by a first degree of change if an actual adjustment amount and an adjustment amount corresponding to application of the correspondence relation with the accelerator pedal position do not coincide. The adjustment amount of the drive source output is a parameter for adjusting the output of a drive source for driving a vehicle, and may be a throttle opening of an engine, a voltage applied to a motor that drives a wheel, and the like, for example. The first degree of change is determined in advance in order to realize a safe and comfortable acceleration, and refers to an amount of change in an adjustment per predetermined unit. For example, if the adjustment amount is applied to the throttle opening of the engine, then the degree of change is equivalent to the amount of change in the throttle opening per unit distance, or the amount of change in the throttle opening per unit time. Therefore, according to the structure of the present invention, when switching from travel that does not apply the correspondence relation to travel that applies the correspondence relation, it is possible to lower a sense of incongruity felt by the driver at such time. Namely, once the end point of the reference speed zone has been passed, a sense of incongruity that arises due to the actual vehicle behavior not coinciding with the vehicle behavior anticipated based on the depression amount of the accelerator pedal (e.g. after passing the end point of the reference speed zone, the vehicle speed rapidly changes despite no great change in the depression amount of the accelerator pedal on the part of the driver) can be lowered.

The control point obtaining unit obtains an end point of the reference speed zone in which the host vehicle travels at a reference speed due to control of the adjustment amount without application of the correspondence relation. The reference speed zone is a road zone set in the driving support device of the present invention as a zone where the vehicle must travel at a certain reference speed. For example, a curve zone having a shape with a constant curvature, a portion of a zone inside a curve zone with a constant curvature, a road zone combining a portion or all of a curve zone with a constant curvature with roads before and/or after, a curve zone having a shape whose curvature radius is equal to or less than a predetermined value, and a road zone with a prescribed speed limit are applicable. The reference speed zone may be fixedly set by obtaining information specifying a road shape (such as a curvature radius, a central angle of a fan shape with a predetermined curvature radius, or a length of an arc of the fan shape with the central angle) or information regarding a speed limit or the like from map information. Also, the reference speed zone may be set based on the driving habits of the driver and information specifying the road shape as learned from the driver's driving habits. The reference speed may be a vehicle speed already associated with the reference speed zone, or determined based on information specifying the reference speed zone and roads before and after. The control point obtaining unit obtains information specifying the position of the end point of a reference speed zone determined in such a manner.

The adjustment amount control unit, after the host vehicle passes the end point of the reference speed zone, changes the adjustment amount by the first degree of change if an actual adjustment amount and an adjustment amount corresponding to application of the correspondence relation with the accelerator pedal position do not coincide. The adjustment amount control unit is applied to a mechanism of a so-called drive-by-wire system, and includes a function that determines an adjustment amount corresponding to the accelerator pedal position (depression amount) based on the correspondence relation and notifies a drive source control unit of the adjustment amount, as well as a function that determines an adjustment amount without application of the correspondence relation (independent of the accelerator pedal position) and notifies the drive source control unit of the adjustment amount. The adjustment amount control unit obtains a current position of the host vehicle, and based on the current position and the position of the end point of the reference speed zone, determines whether the host vehicle has passed the end point of the reference speed zone. Following passage therethrough, the adjustment amount is changed by the first degree of change.

In the present invention, the adjustment amount control unit, after changing the adjustment amount by the first degree of change, may change the adjustment amount by a second degree of change that is larger than the first degree of change. In other words, after first changing the adjustment amount by the first degree of change, the adjustment amount is changed by the second degree of change which is an amount of change in the adjustment amount per predetermined unit that is larger than the first degree of change. According to this structure, compared to changing the adjustment amount by the second degree of change immediately after passing the end point of the reference speed zone, it is possible to achieve a more gradual change in vehicle speed with respect to the depression amount of the accelerator pedal and thus contribute to lowering a sense of incongruity caused by a sudden change in vehicle speed. Moreover, according to this structure, compared to constantly increasing the adjustment by the first degree of change, the actual adjustment amount can more quickly approach and coincide with the adjustment amount that applies the correspondence relation with the actual accelerator pedal position. Faster coincidence leads to a quicker return of control over the acceleration control to the driver after passing the end point of the reference speed zone. In addition, a trigger for shifting from the first degree of change to the second degree of change may be a lapsed time since the start of changing the adjustment amount using the first degree of change (a lapsed time subsequent to passing the end point of the reference speed zone), or a travel distance since the start of changing the adjustment amount using the first degree of change (a travel distance from the end point of the reference speed zone), exceeding a predetermined value set in advance. Alternatively, the trigger may be the position degree of change of the accelerator pedal growing larger than a predetermined value set in advance due to the driver depressing the accelerator pedal.

Furthermore, in the present invention, the control point obtaining unit may obtain an acceleration end point based on a speed of the host vehicle when the host vehicle passes the end point of the reference speed zone and a target speed and target acceleration amount after passing the end point of the reference speed zone, and set a degree-of-change changing point between the end point of the reference speed zone and the acceleration end point, and the adjustment amount control unit may change the adjustment amount by the second degree of change following passage through the degree-of-change changing point. The host vehicle's speed can be obtained from a vehicle speed sensor provided in the host vehicle, for example. Regarding the target speed after the end of acceleration, map information may be referenced in order to obtain the speed limit of the road, or the target speed may be determined based on information specifying the road after the reference speed zone. The target acceleration amount is a parameter for expressing an acceleration operation set in advance for use in determining the position of the acceleration end point. For example, when the adjustment amount is changed by the first degree of change, an acceleration comparable to an estimated acceleration acting on the host vehicle may be employed. The control point obtaining unit derives the position of the acceleration end point based on the host vehicle's speed when passing the end point of the reference speed zone, and the target speed and the target acceleration amount, then sets the degree-of-change changing point between the end point of the reference speed zone and the acceleration end point. The degree-of-change changing point may be set based on information regarding the road from the reference speed zone to the acceleration end point, or set based on a learned result regarding the driving habits of the driver. In cases where the degree-of-change changing point is set based on information regarding the road from the reference speed zone to the acceleration end point, for example, the degree-of-change changing point may be set to an end point of the curve zone expressed by a constant radius, or set to a point at which the curvature radius changes to equal to or greater than a predetermined value. Alternatively, the degree-of-change changing point may be set to a point that is separated from the end point of the reference speed zone by a distance that is a predetermined percentage of the distance from the end point of the reference speed zone to the acceleration end point. According to this structure, when the host vehicle is accelerated after the end point of the reference speed zone at the target acceleration comparable to an estimated acceleration corresponding to the first degree of change, the adjustment amount is changed by the second degree of change from the set degree-of-change changing point up to a point where the target speed is reached (the acceleration end point). Therefore, control over the acceleration control can be returned to the driver before arriving at the acceleration end point. Compared to not setting the degree-of-change changing point based on the road shape and driving habits, setting the degree-of-change changing point based on the road shape and driving habits can achieve acceleration without giving the driver a sense of incongruity. It should be noted that in addition to acceleration, a torque, an engine output, and the like may be adopted for the acceleration amount.

In the present invention, the adjustment amount control unit may change the adjustment amount by the second degree of change it between the end point of the reference speed zone and the degree-of-change changing point, the actual adjustment amount and the adjustment amount corresponding to the accelerator pedal position coincide and a position degree of change of the accelerator pedal following coincidence is equal to or greater than a predetermined value set in advance. In other words, if the driver strongly depresses the accelerator pedal after the actual adjustment amount coincides with the adjustment amount corresponding to the accelerator pedal position due to the driver easing up on the accelerator pedal between the end point of the reference speed zone and the degree-of-change changing point, then the adjustment amount is changed by the second degree of change once it is detected that the accelerator pedal is strongly depressed. Here, the position degree of change of the accelerator pedal refers to an amount of change in the position of the accelerator pedal per predetermined unit, and the accelerator pedal position can be obtained, for example, from a position sensor that detects the position of the accelerator pedal. The position degree of change of the accelerator pedal being equal to or greater than a predetermined value means that the amount of change in the position per predetermined unit has exceeded the predetermined value, i.e., the accelerator pedal has been rapidly (strongly) depressed. Note that if the position degree of change of the accelerator pedal is smaller than a predetermined value set in advance after the actual adjustment amount coincides with the adjustment amount corresponding to the accelerator pedal position, then the adjustment amount is changed by the first degree of change until the degree-of-change changing point. In other words, until the degree-of-change changing point is passed, the adjustment amount is changed by the first degree of change or the second degree of change without applying the above-mentioned correspondence relation even after the actual adjustment amount coincides with the adjustment amount corresponding to the actual position of the accelerator pedal. Thus, from the end point of the reference speed zone to at least the degree-of-change changing point, it can be ensured that the vehicle does not rapidly accelerate faster than the second degree of change. Furthermore, if the position degree of change of the accelerator pedal becomes equal to or greater than the predetermined value due to the driver's operation, then the adjustment amount is increased by the second degree of change. Therefore, compared to changing the adjustment amount by the first degree of change despite the position degree of change being equal to or greater than the predetermined value, the degree of change of the actual adjustment amount can more closely approach the degree of change of the adjustment amount that corresponds to the change in the position of the accelerator pedal due to the driver's operation. Accordingly, the behavior of the vehicle can more quickly match the driver's sense of the depression amount of the accelerator pedal.

In the present invention, the adjustment amount control unit may change the adjustment amount by either the first degree of change or the second degree of change following passage through the acceleration end point if the actual adjustment amount and the adjustment amount corresponding to the accelerator pedal position do not coincide. According to this structure, when the acceleration end point is passed, even if the actual adjustment amount and the adjustment amount corresponding to the accelerator pedal position do not coincide, it is possible to prevent the vehicle from rapidly accelerating despite the driver not greatly changing the depression amount of the accelerator pedal.

In the present invention, the adjustment amount control unit may obtain a limit acceleration amount that does not generate slip in the host vehicle, and change the adjustment amount by a degree of change corresponding to the limit acceleration amount if an acceleration amount acting on the host vehicle when the adjustment amount is assumed to be changed by either the first degree of change or the second degree of change exceeds the limit acceleration amount. According to this structure, it is possible to accelerate the host vehicle by an acceleration amount that does not generate slip.

It should be noted that the present invention describes a technique wherein an end point of a reference speed zone is obtained in which a host vehicle travels at a reference speed by controlling an adjustment amount of a drive source output of the host vehicle, without applying a preset correspondence relation regarding an accelerator pedal position and the adjustment amount of the drive source output of the host vehicle; and after the host vehicle passes the end point of the reference speed zone, the adjustment amount is changed by a first degree of change if an actual adjustment amount and an adjustment amount corresponding to application of the correspondence relation with the accelerator pedal position do not coincide. However, this technique can also be applied in the forms of a program and a method that carry out such processing. The above-described driving support device, program, and method include various forms, and may be realized as an individual device, or realized through parts used in common with respective components provided in the vehicle. The present invention can also be modified as desired, such as by providing a portion of it in the form of software and a portion of it in the form of hardware, for example. The present invention may also be practiced in the form of a storage medium for a program that controls the driving support device. Obviously, such a software storage medium may be a magnetic storage medium, and it may also be a magneto optical storage medium. Furthermore, any storage medium that is developed henceforth can also be considered to be exactly the same.

BRIEF DESCRIPTION OF THE DRAWINGS

FIG. 13 is a table showing correspondence among a control state, a current location state, and a throttle control;
FIG. 14 is an explanatory drawing that describes forces acting on a host vehicle;
FIGS. 15A to 15C are graphs showing examples of changes regarding an accelerator opening and a throttle opening.

DETAILED DESCRIPTION OF THE EMBODIMENTS

Figure 1:
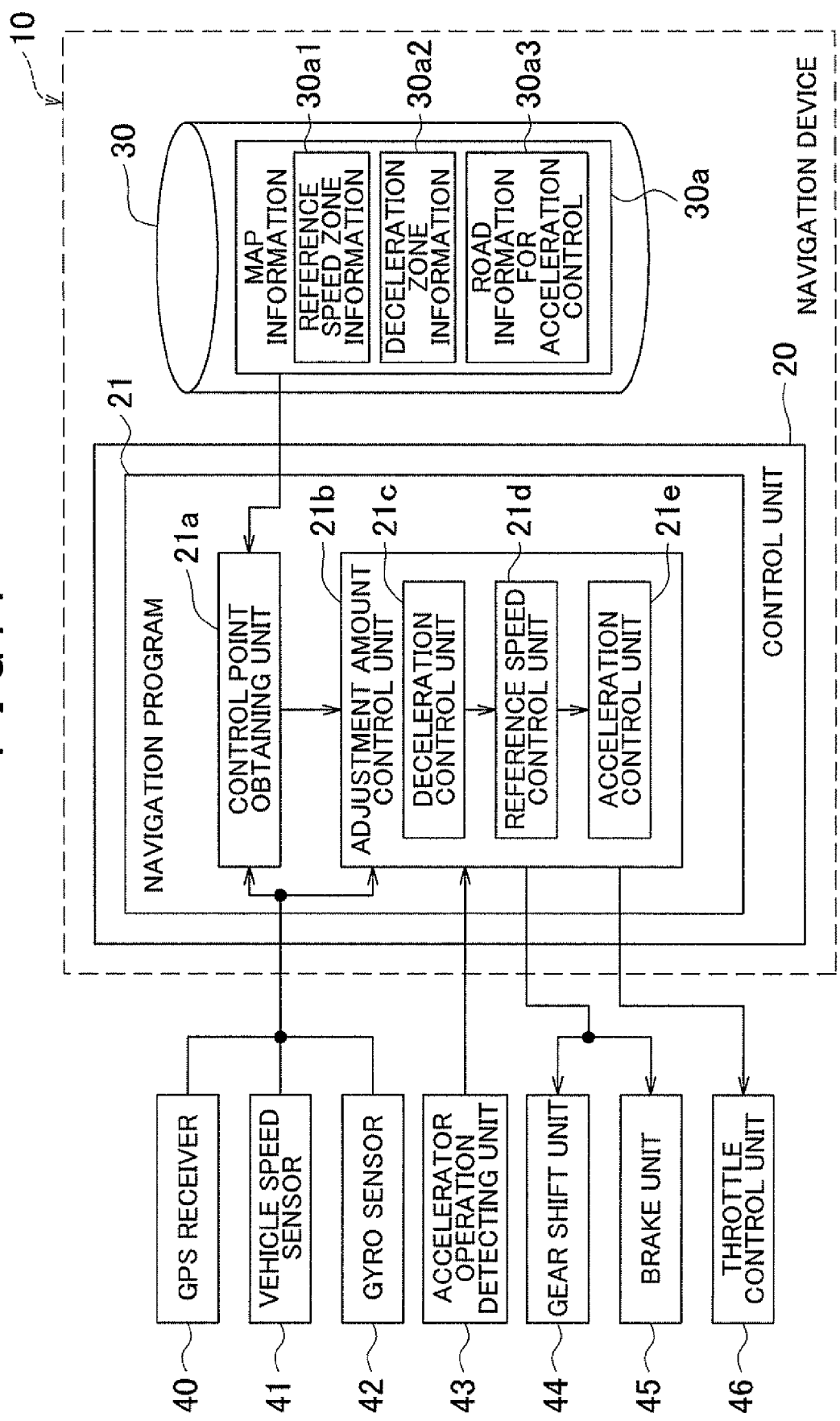
FIG. 1 is a block diagram of a navigation device.

Hereinafter, embodiments of the present invention will be described in the following order
(1) Navigation Device Structure
(2) Driving Support Processing
   (2-1) Reference Speed Processing
   (2-2) Initial Setting Processing
   (2-3) Acceleration Control Processing
(3) Operation Example
(4) Other Embodiments (1) Navigation Device Structure FIG. 1 is a block diagram showing the structure of a navigation device 10 that includes a driving support device according to the present invention. The navigation device 10 includes a control unit 20 that has a CPU, a RAM, a ROM, and the like, and a memory medium 30. The navigation device 10 is capable of executing a program stored in the memory medium 30 and the ROM using the control unit 20. In the present embodiment, one such executable program is a navigation program 21, wherein the navigation program 21 has a function for performing driving support when traveling through a curve zone.

In order to realize the above function performed by the navigation program 21, the host vehicle (a vehicle installed with the navigation device 10) is provided with a GPS receiver 40, a vehicle speed sensor 41, a gyro sensor 42, an accelerator operation detecting unit 43, a gear shift unit 44, a brake unit 45, and a throttle control unit 46. The function performed by the navigation program 21 is realized by these units and the control unit 20 working in cooperation.

The GPS receiver 40 receives radio waves from a GPS satellite and outputs a signal for calculating a current position of the host vehicle via an interface (not shown). The control unit 20 receives the signal to obtain the current position of the host vehicle. The vehicle speed sensor 41 outputs a signal that corresponds to a rotational speed of a wheel provided in the host vehicle. The control unit 20 obtains this signal via an interface (not shown) to obtain the speed of the host vehicle. The gyro sensor 42 detects an angular acceleration when the host vehicle turns within a horizontal plane and outputs a signal that corresponds to the orientation of the host vehicle. The control unit 20 obtains this signal via an interface (not shown) to obtain the travel direction of the host vehicle. The vehicle speed sensor 41 and the gyro sensor 42 are utilized for correcting the current position of the host vehicle as identified from the output signal of the GPS receiver 40, and the like. In addition, the current position of the host vehicle is corrected as appropriate based on verification with map information 30a described later.

The structure of the accelerator operation detecting unit 43 includes a position sensor that detects an accelerator pedal position. The accelerator operation detecting unit 43 outputs information indicating the detected position of the accelerator pedal, and the control unit 20 obtains the position (a depression amount) of the accelerator pedal based on such information.

The gear shift unit 44 includes an automatic transmission that has a plurality of shift speeds, such as six forward speeds, one reverse speed, and the like. The gear shift unit 44 can transmit the driving force of an engine to a wheel of the host vehicle while using gear ratios that correspond to the various shift speeds to regulate the engine rotational speed. The control unit 20 outputs a control signal for changing a shift speed via an interface (not shown), and the gear shift unit 44 is capable of obtaining the control signal to change the shift speed. In the present embodiment, as the shift speed increases to a higher gear, such as from the forward first speed towards the forward sixth speed, the gear ratio becomes smaller.

The brake unit 45 includes a device that controls a pressure of a wheel cylinder, which adjusts the degree of deceleration realized by a brake mounted in the wheel of the host vehicle. The control unit 20 outputs a control signal to the brake unit 45 whereby the pressure of the wheel cylinder can be adjusted. Accordingly, the control signal output to the brake unit 45 by the control unit 20 increases the pressure of the wheel cylinder, which increases a braking force generated by the brake and decelerates the host vehicle.

The throttle control unit 46 includes a device that controls a throttle valve for adjusting an amount of air supplied to the engine mounted in the host vehicle, and the throttle control unit 46 adjusts an opening of the throttle valve (which is referred to as a throttle opening below) in response to the accelerator pedal position as detected by the accelerator operation detecting unit 43. The throttle control unit 46 is capable of using a so-called drive-by-wire system to regulate the throttle opening, and can regulate the throttle opening based on a control signal output to the throttle control unit 46 by the control unit 20. Accordingly, output of the control signal to the throttle control unit 46 by the control unit 20 increases the amount of intake air, which increases the rotational speed of the engine. Note that since the control unit 20 is a structure that gives control instructions to the gear shift unit 44 and the throttle control unit 46, the control unit 20 can obtain both a current gear ratio set by the gear shift unit 44 and a current throttle opening set by the throttle control unit 46.

By executing the navigation program 21, the control unit 20 performs a route search and the like for the vehicle based on output information from the GPS receiver 40 and map information described later, and also performs route guidance and the like via a display portion or a speaker (not shown). In order to carry out driving support when traveling through a curve zone, the navigation program 21 is provided with a control point obtaining unit 21a, and an adjustment amount control unit 21b (which includes a deceleration control unit 21c, a reference speed control unit 21d, and an acceleration control unit 21e).

In addition, the memory medium 30 stores the map information 30a for carrying out the above-described function performed by the navigation program 21. The map information 30a includes node data indicating nodes set on roads traveled by vehicles, shape interpolation data for identifying the shape of a road between nodes, link data indicating connections between nodes, and data indicating landmark objects existing on or around a road. The map information 30a is used for identifying the current position of the host vehicle, performing a route search to a destination, performing route guidance to the destination, executing driving support when traveling through a curve zone, and the like.

Figure 2:
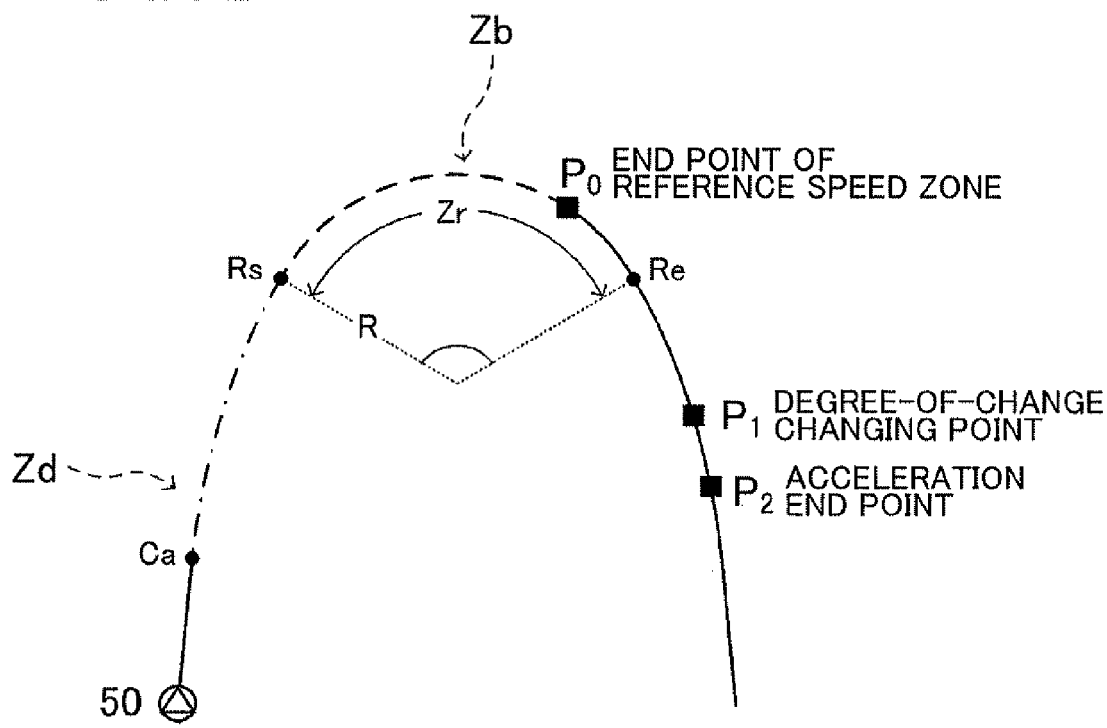
FIG. 2 is a schematic drawing showing a reference speed zone and road zones before and after.

According to the present embodiment, deceleration to a reference speed is performed before a reference speed zone is reached, and travel at the reference speed is maintained in the reference speed zone. After passing an end point of the reference speed zone, acceleration toward a target speed is performed. The reference speed zone is a road zone set as a zone in which vehicles must travel at a certain reference speed (a constant speed in the present embodiment). Therefore, information indicating the reference speed zone and roads before and after is included in the map information 30a. FIG. 2 is a schematic drawing showing a curve zone Zr with a constant radius R and roads before and after the curve zone Zr. FIG. 2 illustrates a situation where a host vehicle 50 is traveling toward the curve zone Zr. The curve zone Zr with the constant radius R is a road zone between nodes Rs and Re, and in the present embodiment, the reference speed zone is set between the start point Rs and the end point Re of the curve zone Zr with a constant radius. More specifically, according to the present embodiment, a start point of a reference speed zone Zb (a zone indicated by a dashed line in FIG. 2) is identical to the start point Rs of the curve zone Zr. Meanwhile, an end point of the reference speed zone Zb is set to a point $P_0$ between a shape interpolation point corresponding to a median point of the curve zone Zr and the end point Re of the curve zone Zr (e.g. a median point between the above-mentioned median point and the point Re). In the present embodiment, node data corresponding to the start point Rs of the reference speed zone Zb is associated with information indicating the start point Rs of the reference speed zone Zb, and shape interpolation data corresponding to the end point $P_0$ of the reference speed zone 7b is associated with information indicating the end point $P_0$ of the reference speed zone Zb.

Shape interpolation data indicating the shape of the road within the reference speed zone Zb is data that indicates positions on the arc of the curve zone Zr with the constant radius R. Based on such shape interpolation data, it is possible to identify a speed (a reference speed Vreq) for traveling at a constant speed through the reference speed zone Zb with the radius R. For the present embodiment, information specifying the start point Rs and the end point $P_0$ of the reference speed zone Zb, as well as the shape interpolation data therebetween, is referred to as reference speed zone information $30a1$.

A section before the above-described reference speed zone Zb is set having a deceleration zone Zd (a section indicated by a dashed-dotted line in FIG. 2) for performing deceleration before the reference speed zone Zb is reached. In the present embodiment, node data corresponding to a start point Ca of the deceleration zone Zd is associated with information indicating the start point Ca of the deceleration zone Zd. Note that in the present embodiment, an end point of the deceleration zone Zd coincides with the start point Rs of the reference speed zone Zb, and the shape of the road between the start point Ca of the deceleration zone Zd and the start point Rs of the reference speed zone Zb (the end point of the deceleration zone Zd) is specified by shape interpolation data. For the present embodiment, information specifying the start point Ca and the end point Rs of the deceleration zone Zd, as well as the shape interpolation data indicating the shape of the road therebetween, is referred to as deceleration zone information $30a2$.

Furthermore, information indicating the road after the above-described reference speed zone Zb is referred to as road information for acceleration control $30a3$ in the present embodiment. The road information for acceleration control $30a3$ includes node data, shape interpolation data, link data, and the like regarding the road after the reference speed zone Zb.

The control point obtaining unit $21a$ is a module that realizes in the control unit 20 a function for obtaining the positions of the start point Ca of the deceleration zone Zd, the start point Rs of the reference speed zone Zb, and the end point $P_0$ of the reference speed zone Zb, based on the deceleration zone information $30a2$ and the reference speed zone information $30a1$ described above. The control point obtaining unit $21a$ obtains an acceleration end point $P_2$ based on a speed when the host vehicle 50 passes the end point $P_0$ of the reference speed zone Zb, a target speed $V_1$ subsequent to the end of acceleration, and a target acceleration a. Based on the road information for acceleration control $30a3$, a degree-of-change changing point $P_1$ is set between the end point $P_0$ and the acceleration end point $P_2$. Note that in the present embodiment, the target acceleration a is employed as a target acceleration amount.

Figure 3:
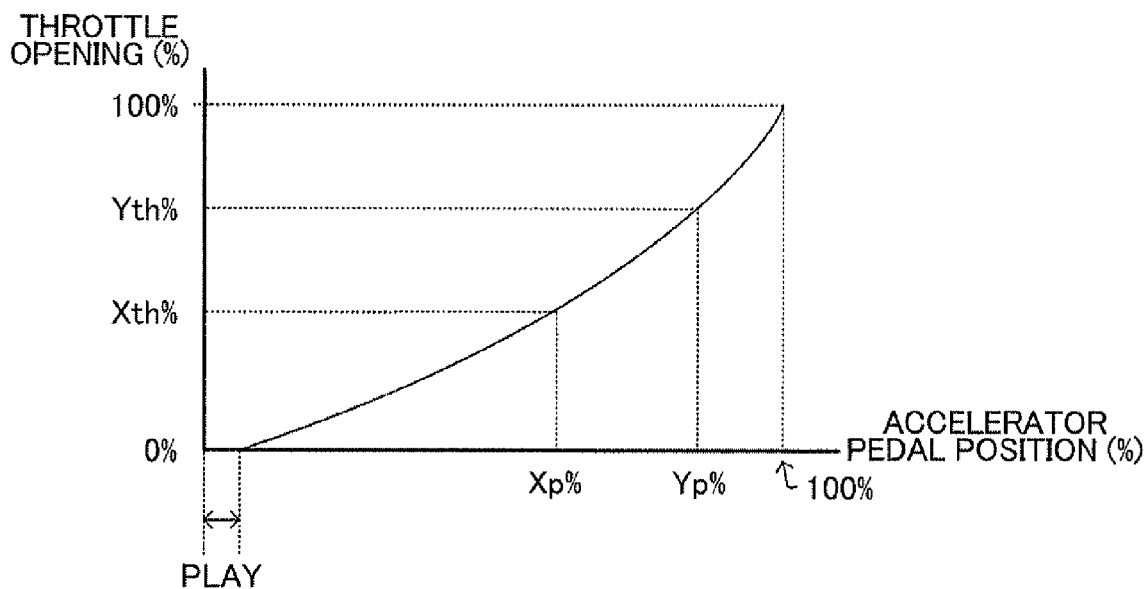
FIG. 3 is a graph showing a correspondence relation between an accelerator pedal position and a throttle opening.

The adjustment amount control unit $21b$ is a module that realizes in the control unit 20 a function for controlling the throttle opening without applying a preset correspondence relation regarding the accelerator pedal position and a throttle opening that serves as an adjustment of the output of the drive source. FIG. 3 is a graph showing an example of the preset correspondence relation regarding the accelerator pedal position and adjustment of the output of the drive source, and specifically shows a correspondence relation between the throttle opening (%) and the accelerator pedal position (%). The horizontal axis indicates the accelerator pedal position, wherein 0% corresponds to an initial position of the accelerator pedal where the accelerator pedal is not depressed. A rightward progression in the graph indicates a larger depression amount, and at 100% the accelerator pedal is completely depressed. The vertical axis indicates the throttle opening, wherein 0% indicates the throttle is fully closed and 100% indicates the throttle is fully open. The adjustment amount control unit $21b$ is provided with a function that adjusts the rotational speed of the engine by referring to this correspondence relation to obtain the throttle opening with respect to the accelerator pedal position (depression amount) and outputting information specifying the throttle opening to the throttle control unit 46, and also provided with a function that adjusts the rotational speed of the engine using the throttle opening after determining the throttle opening or a degree of change of the throttle opening without applying this correspondence relation. In order to realize the latter function, the adjustment amount control unit $21b$ includes the deceleration control unit $21c$, the reference speed control unit $21d$, and the acceleration control unit $21e$.

The deceleration control unit $21c$ is a module that realizes in the control unit 20 a function for controlling the throttle opening to decelerate the host vehicle to the reference speed before the host vehicle reaches the start point of the reference speed zone. In the present embodiment, after passing the start point Ca of the deceleration zone Zd, the host vehicle is decelerated to the reference speed Vreq in the deceleration zone Zd before reaching the start point Rs of the reference speed zone Zb. In the present embodiment, during such deceleration, at least a throttle control (in which the throttle opening is fully closed or closed more compared to before the start of the deceleration control) by the adjustment amount control unit $21b$ is performed. Naturally the control unit 20 may output a deceleration instruction to the gear shift unit 44 and the brake unit 45 as well to perform braking by the brake and down-shifting of the transmission at the same time.

The reference speed control unit $21d$ is a module that realizes in the control unit 20 a function for controlling the throttle opening to run the host vehicle at the reference speed while the host vehicle travels through a curve zone. Namely, after passing the point Rs, the throttle control performed by the reference speed control unit $21d$ runs the vehicle so as to maintain the reference speed during travel in the reference speed zone Zb up to the point $P_0$.

The acceleration control unit $21e$ is a module that realizes in the control unit 20 a function for varying the throttle opening using a preset degree of change when, after the host vehicle passes the end point $P_0$ of the reference speed zone Zb, a throttle opening corresponding to application of the correspondence relation with the accelerator pedal position and the actual throttle opening do not coincide. The degree of change refers to an amount of change in an adjustment amount per predetermined unit, and in the case of the present embodiment, the degree of change means an amount of change in the throttle opening per unit distance. The degree of change may also express an amount of change in the throttle opening per unit time. Note that if the throttle opening corresponding to application of the correspondence relation with the accelerator pedal position and the actual throttle opening coincide after the point $P_1$ as described later, the acceleration control unit $21e$ ends the throttle control that does not apply the correspondence relation, and thereafter applies the correspondence relation. In other words, the throttle opening varies in accordance with the amount by which the driver depresses the accelerator pedal.

Note that the deceleration control unit $21c$, the reference speed control unit $21d$, and the acceleration control unit $21e$ control the host vehicle so as not to accelerate more than is required by the driver's accelerator operation. Namely, in the deceleration control, the reference speed control, and the acceleration control, the actual throttle opening is controlled so as not to become larger than the throttle opening corresponding to the accelerator pedal position.

The above section described the structure of the navigation device 10.

(2) Driving Support Processing

Figure 4:
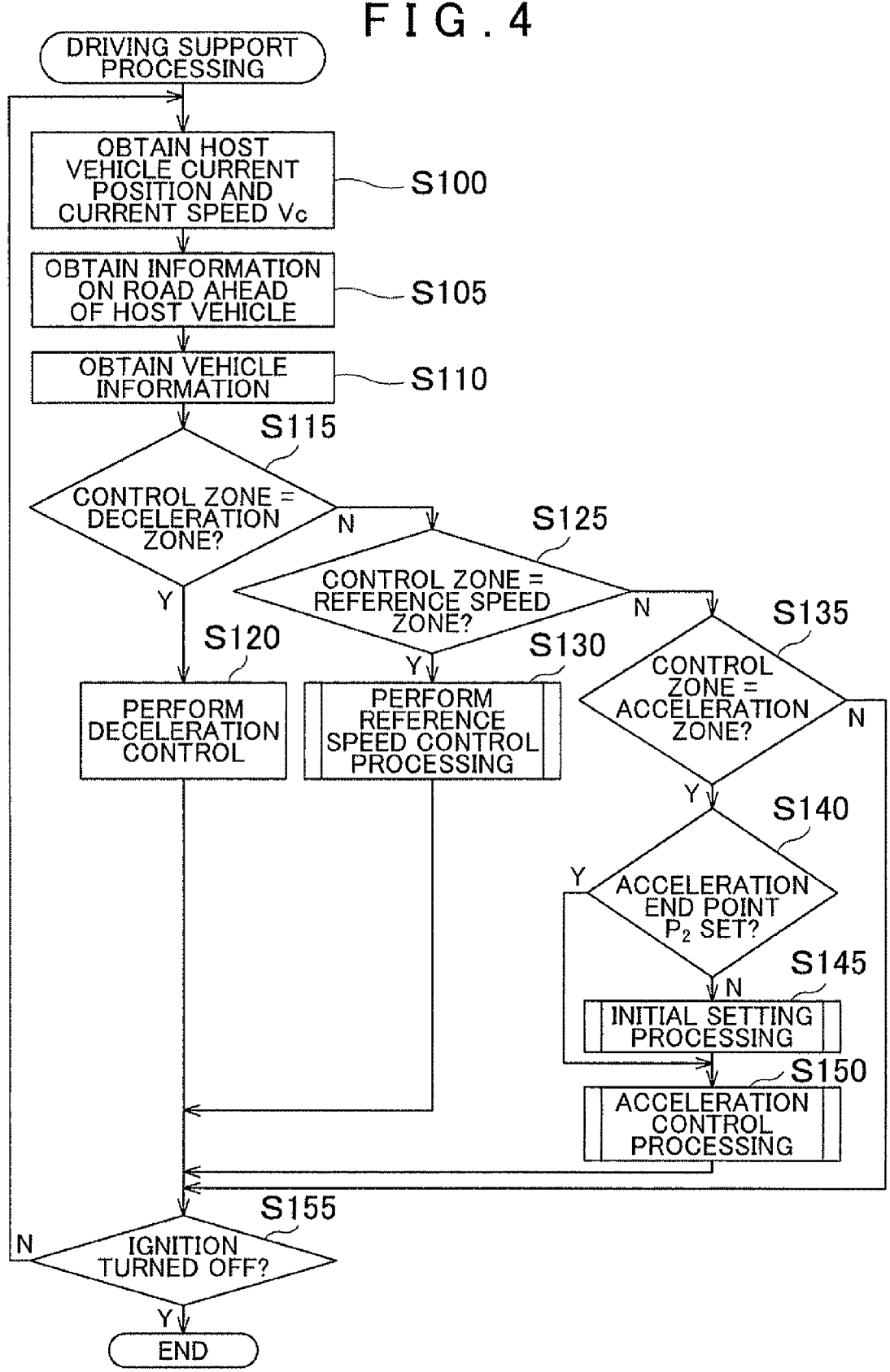
FIG. 4 is a flowchart showing driving support processing.

Next, the driving support processing that is executed by the navigation device 10 in the configuration described above will be explained. When the navigation device 10 executes the navigation program 21, the driving support processing shown in FIG. 4 is executed through the functions of the modules provided in the navigation program 21.

First, the control unit 20 obtains the host vehicle's current position and a current speed Vc (step S100). The control unit 20 then refers to the map information 30a to obtain road information within a predetermined range ahead of the current position of the host vehicle (step S105), and obtains vehicle information (step 1110). More specifically, the control unit 20 obtains the current position of the host vehicle based on the output signal of the GPS receiver 40 or the like, and refers to the road information to search whether there is a reference speed zone within a predetermined range ahead of the current position. If there is a reference speed zone, then the reference speed zone information 30a1 pertaining to the zone, as well as the deceleration zone information 30a2 and the road information for acceleration control 30a3, which are both information regarding roads adjacent to the start and end of the zone, are obtained. Based on the deceleration zone information 30a2, the reference speed zone information 30a1, and the road information for acceleration control 30a3, the control unit 20 obtains the start point Ca of the deceleration zone Zd, and the positions of the start point Rs and the end point $P_0$ of the reference speed zone Zb to identify in which zone (control zone) the current position of the host vehicle is located. If the current position of the host vehicle is located between the point Ca and the start point Rs, then the control zone is designated as the deceleration zone; if the current position of the host vehicle is located between the start point Rs and the end point $P_0$, then the control zone is designated as the reference speed zone; and if the current position of the host vehicle is located after the end point $P_0$, then the control zone is designated as the acceleration zone. Note that the vehicle information includes information regarding a vehicle weight and the like, and the vehicle information is stored in advance in the memory medium 30.

Next, the control unit 20 determines whether the control zone is the deceleration zone (step S115). If the control zone is not the deceleration zone, then the control unit 20 determines whether the control zone is the reference speed zone (step S125). If the control zone is not the reference speed zone, then the control unit 20 determines whether the control zone is the acceleration zone (step S135). If it is determined at step S115 that the control zone is the deceleration zone, then the control unit 20 executes the processing of the deceleration control unit 21c to obtain the reference speed Vreq and perform a deceleration control such that the vehicle speed when passing the point Rs is the reference speed Vreq (step S120). More specifically, the control unit 20 refers to the reference speed zone information 30a1 to identify the radius R of the reference speed zone Zb, and obtains as the reference vehicle speed Vreq a vehicle speed $(Gt \cdot R)^{1/2}$ for traveling at a constant speed and at a preset lateral acceleration Gt (e.g. 0.2 G) through a zone having the radius R. For example, in a road of a distance Lc from the current position of the host vehicle to the point Rs, a required deceleration Gr (a negative acceleration when the traveling direction of the host vehicle is considered positive) that serves as a deceleration amount required in order to set the host vehicle's current speed Vc to the reference speed Vreq is obtained as, for example, $Gr=(Vreq^2-Vc^2)/(2Lc)$, assuming a uniform accelerated motion. Accordingly, the host vehicle is decelerated such that the actual deceleration operation of the host vehicle resembles the deceleration operation indicated by the required deceleration Gr.

Figure 5:
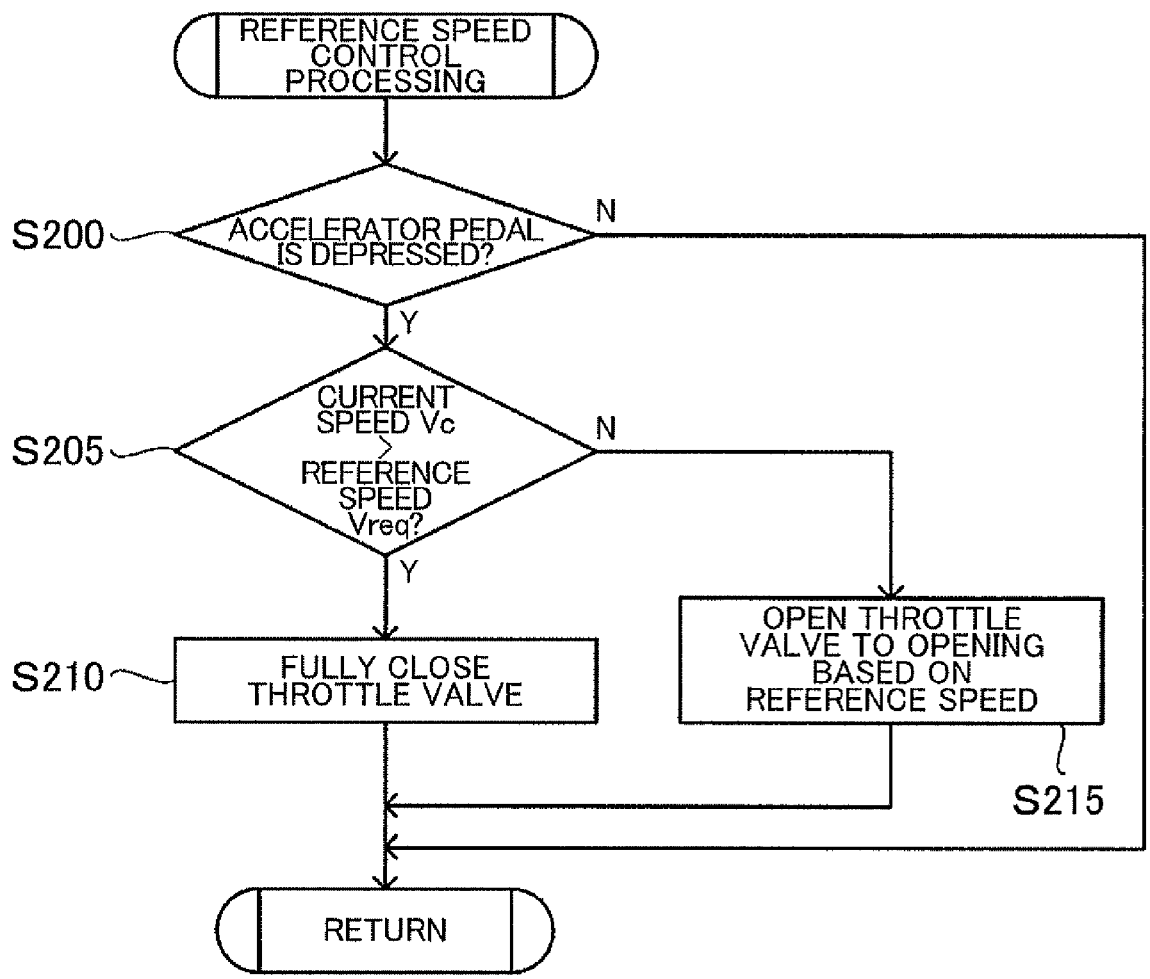
FIG. 5 is a flowchart showing reference speed control processing.

If it is determined at step S125 that the control zone is the reference speed zone, then the control unit 20 executes the processing (reference speed control processing) of the reference speed control unit 21d (step S130, FIG. 5). If it is determined at step S135 that the control zone is within the acceleration zone, then the control unit 20 determines whether the acceleration end point $P_2$ has been set (step S140). If the acceleration end point $P_2$ has not been set, then the control unit 20 executes the initial setting processing (step S145, FIG. 8). The control unit 20 then executes the acceleration control processing through processing of the acceleration control unit 21e (step S150, FIG. 10). Next, the control unit 20 determines whether an ignition switch of the host vehicle is turned off (step S155). If the ignition switch is not turned off, then the processing starting from step S100 above is repeatedly executed.

(2-1) Reference Speed Processing

FIG. 5 is a flowchart showing the flow of the reference speed control processing executed at step S130 in the driving support processing. First, the control unit 20 determines whether the accelerator pedal is in a depressed state (step S200). If the accelerator pedal is not in a depressed state, then the reference speed control processing is ended. More specifically, the control unit 20 obtains the accelerator pedal position from the accelerator operation detecting unit 43 to determine whether the accelerator pedal is depressed. If it is determined at step S200 that the accelerator pedal is depressed, then the control unit 20 determines whether the host vehicle's current speed Vc exceeds the reference speed Vreq (step S205). If the current speed Vc exceeds the reference speed Vreq, then the throttle opening is fully closed by executing processing of the reference speed control unit 21d (step 210). If the current speed Vc does not exceed the reference speed Vreq, then the throttle opening is set to an opening based on the reference speed by executing processing of the reference speed control unit 21d (step S215).

Figure 6:
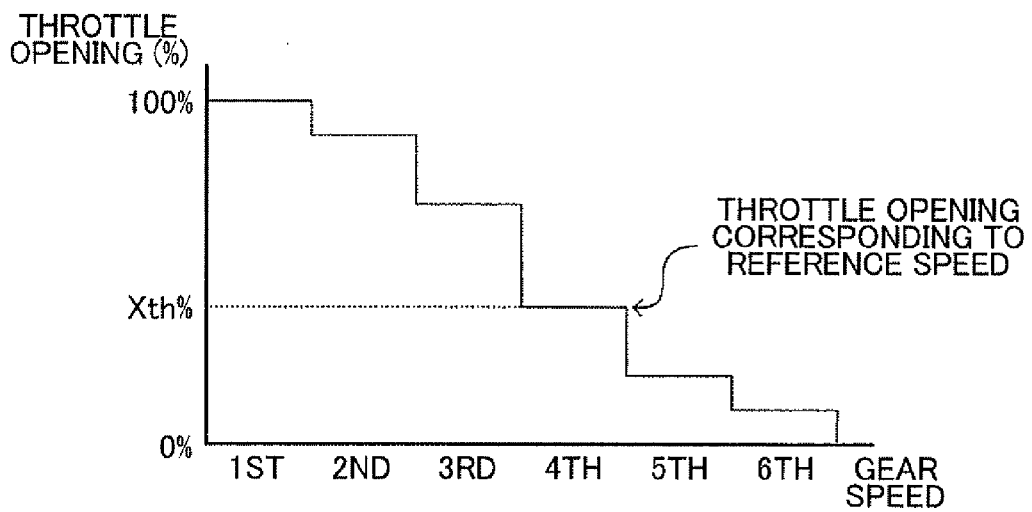
FIG. 6 is a graph showing a relation between a shift speed and the throttle opening.
Figure 7:
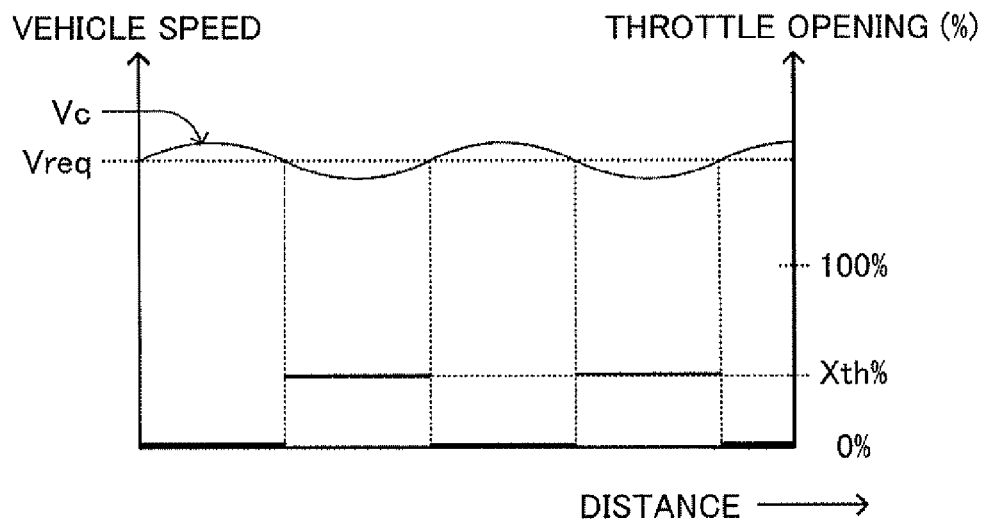
FIG. 7 is a graph showing an example of changes regarding a vehicle speed and an actual throttle opening.

For every vehicle speed set as a reference speed, the navigation device 10 according to the present embodiment has information that specifies a relation between shift speeds and the throttle opening when running a vehicle at such vehicle speeds. FIG. 6 is a graph showing an example of the relation between shift speeds and the throttle opening required when running the host vehicle at the reference speed Vreq. For example, regarding a throttle opening Xth % shown in FIG. 6, if the shift speed is the fourth speed when the host vehicle passes the start point Rs of the reference speed zone Zb, then the throttle opening Xth % is indicated as the required throttle opening in order to travel at fourth speed through the reference speed zone while maintaining the reference speed Vreq. In such case, the throttle valve is opened only Xth % at step S215. FIG. 7 is graph showing how the speed Vc of the host vehicle shifts among the reference speed Vreq plus or minus a predetermined range due to repetition of the throttle opening 0% (fully closed) and Xth % in the reference speed zone Zb as a result of repetition of the reference speed control processing described above. The above section described the reference speed control processing.

(2-2) Initial Setting Processing

Figure 8:
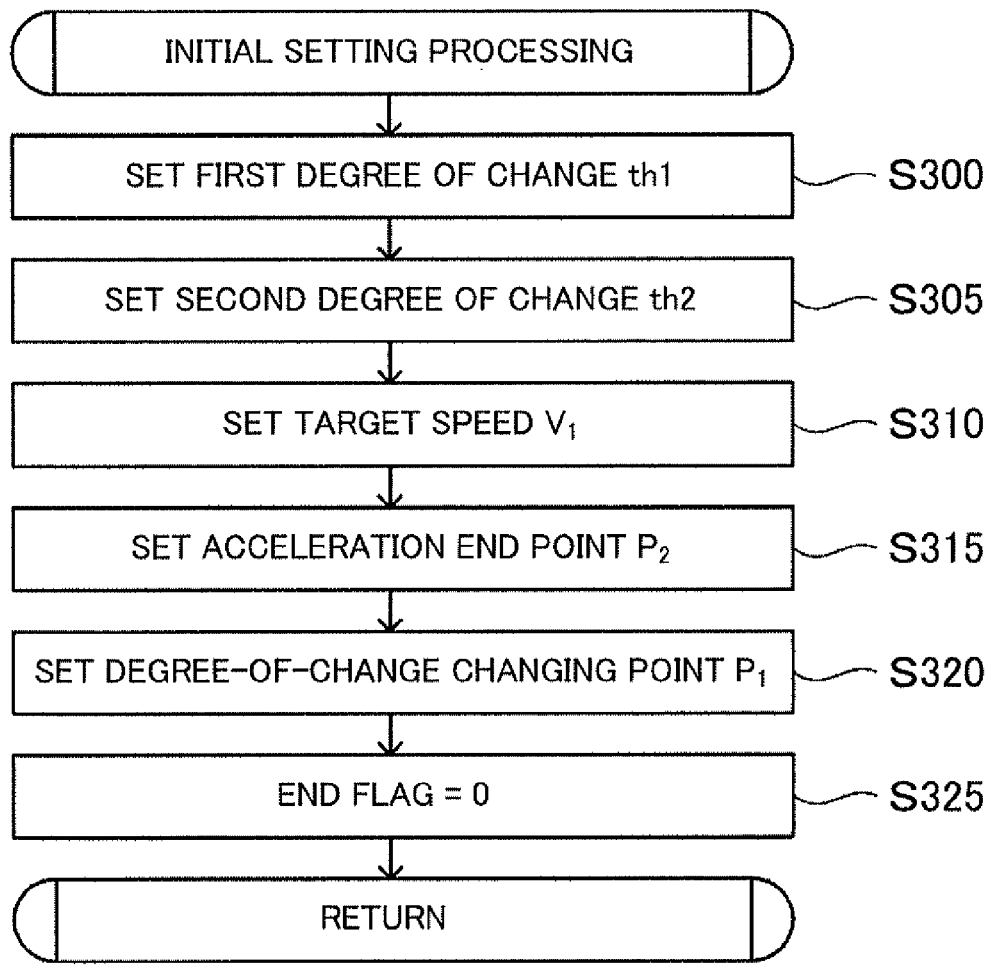
FIG. 8 is a flowchart showing initial setting processing.

Next, the initial setting processing executed at step S145 in the driving support processing will be explained using FIG. 8. The control unit 20 first sets a first degree of change th1 (step S300), and then sets a second degree of change th2 that is larger than the first degree of change th1 (step S305). The first degree of change th1 is a preset characteristic for realizing a safe and comfortable acceleration, and specifies an amount of change in the throttle opening per unit distance in the present embodiment. For example, the value of the first degree of change th1 is calculated in advance such that an acceleration of approximately 0.2 G acts on the host vehicle in accordance with the current gear ratio, and the value specifying the first degree of change th1 is stored in the ROM or the memory medium 30. The second degree of change is preset as a value larger than the first degree of change (with a large amount of change in the throttle opening per unit distance), and is stored in the ROM or the memory medium 30. The control unit 20 next sets the target speed $V_1$ subsequent to the end of acceleration, i.e., subsequent to passing the end point $P_0$ of the reference speed zone Zb (step S310). More specifically for example, the control unit 20 may refer to the map information 30a to obtain a control speed set between the curve zone Zr and a road zone thereafter, which is then used as the target speed $V_1$. In addition, the target speed $V_1$ may be determined based on road conditions, or the shape of the road subsequent to the reference speed zone Zb.

Figure 9:
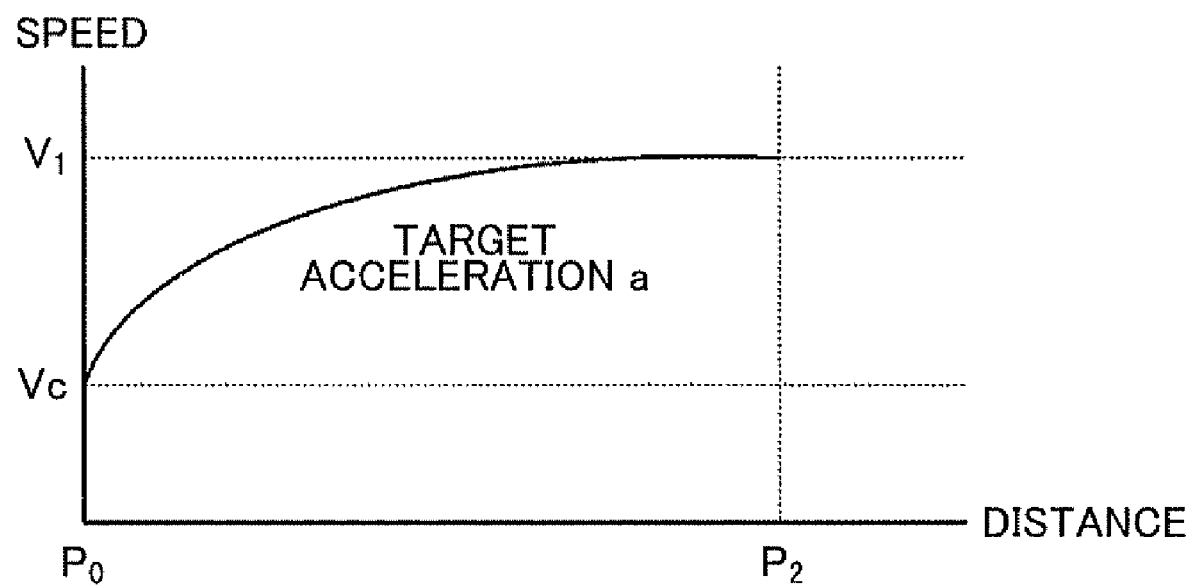
FIG. 9 is a graph for explaining setting of an acceleration end point.

The control unit 20 next obtains the position of an acceleration end point $P_2$ based on the current speed Vc when the host vehicle passes the end point $P_0$ of the reference speed zone Zb, the target speed $V_1$ subsequent to the end of acceleration, i.e., subsequent to passing the point $P_0$, and the target acceleration a subsequent to passing the point $P_0$ (step S315). More specifically, the acceleration end point $P_2$ is designated as a point that is $(V_1^2-Vc^2)/2a$ ahead of the end point $P_0$ of the reference speed zone Zb on the road. FIG. 9 shows a distance $((V_1^2-Vc^2)/2a)$ until the target speed $V_1$ is reached when the host vehicle accelerates at the target acceleration a from the speed Vc upon passing the point $P_0$. Here, the target acceleration a is a preset acceleration used for determining the position of the acceleration end point, and a value comparable to the acceleration used as a reference in calculating the first degree of change is employed, for example.

The control unit 20 next sets the degree-of-change changing point $P_1$ between the end point $P_0$ of the reference speed zone Zb and the acceleration end point $P_2$ (step S320). The degree-of-change changing point $P_1$ may be set based on information regarding the road from the end point $P_0$ of the reference speed zone Zb to the acceleration end point $P_2$, or set based on a learned result regarding the driving habits of the driver. In cases where the degree-of-change changing point $P_1$ is set based on information regarding the road from the reference speed zone Zb to the acceleration end point $P_2$, for example, the degree-of-change changing point $P_1$ may be set to the end point Re of the curve zone Zr expressed by the constant radius R, or set to a point at which a curvature radius changes to equal to or greater than a predetermined value (>R). Alternatively, the degree-of-change changing point $P_1$ may be set to a point that is separated from the point $P_0$ by a distance that is a predetermined percentage of the distance from the end point $P_0$ of the reference speed zone Zb to the acceleration end point $P_2$. In the present embodiment, a point at which the curvature radius changes to equal to or greater than a predetermined value is set as the degree-of-change changing point $P_1$. The control unit 20 then sets an end flag to 0 (step S325). The above section described the initial setting processing.

(2-3) Acceleration Control Processing

Figure 10:
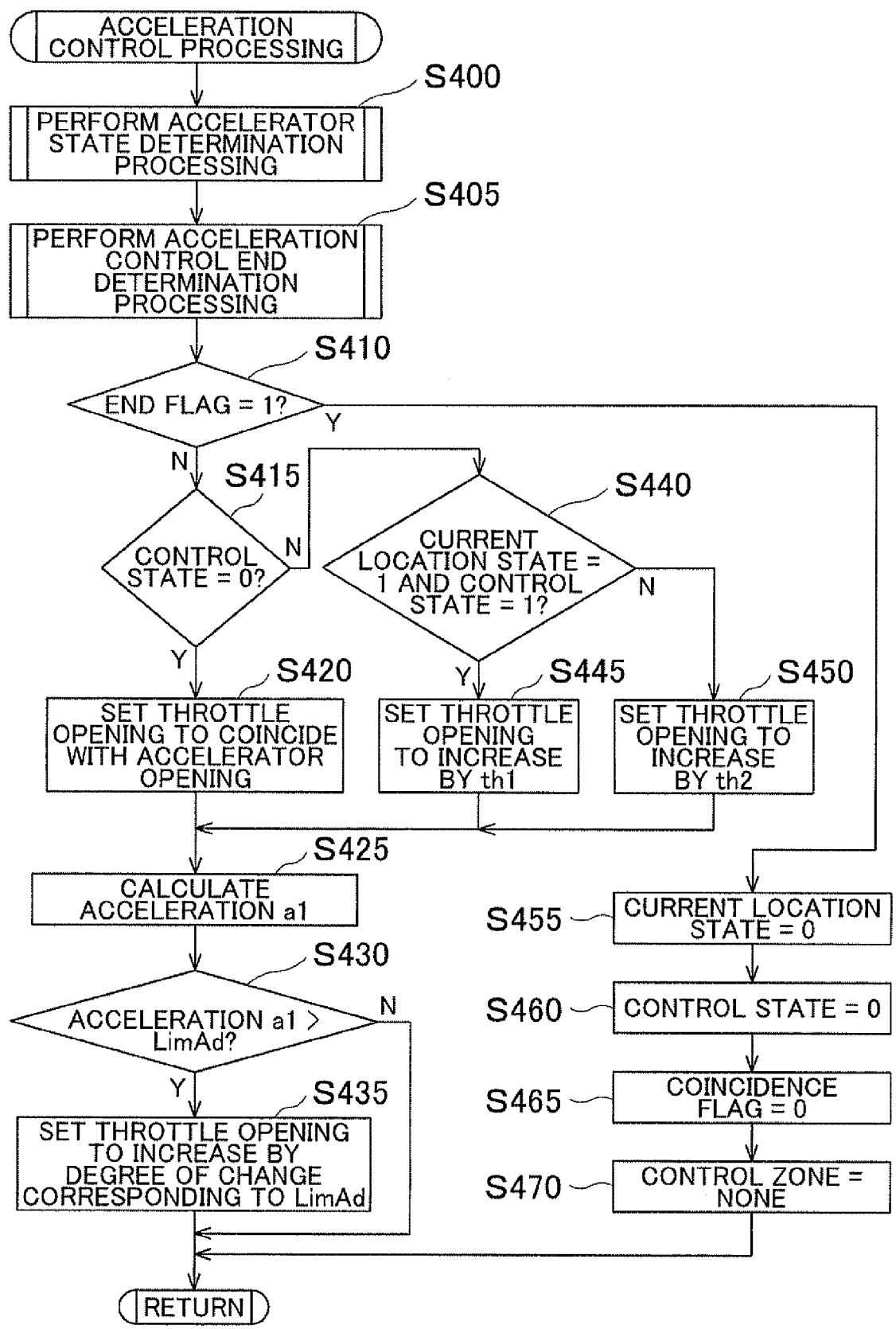
FIG. 10 is a flowchart showing acceleration control processing.
Figure 11:
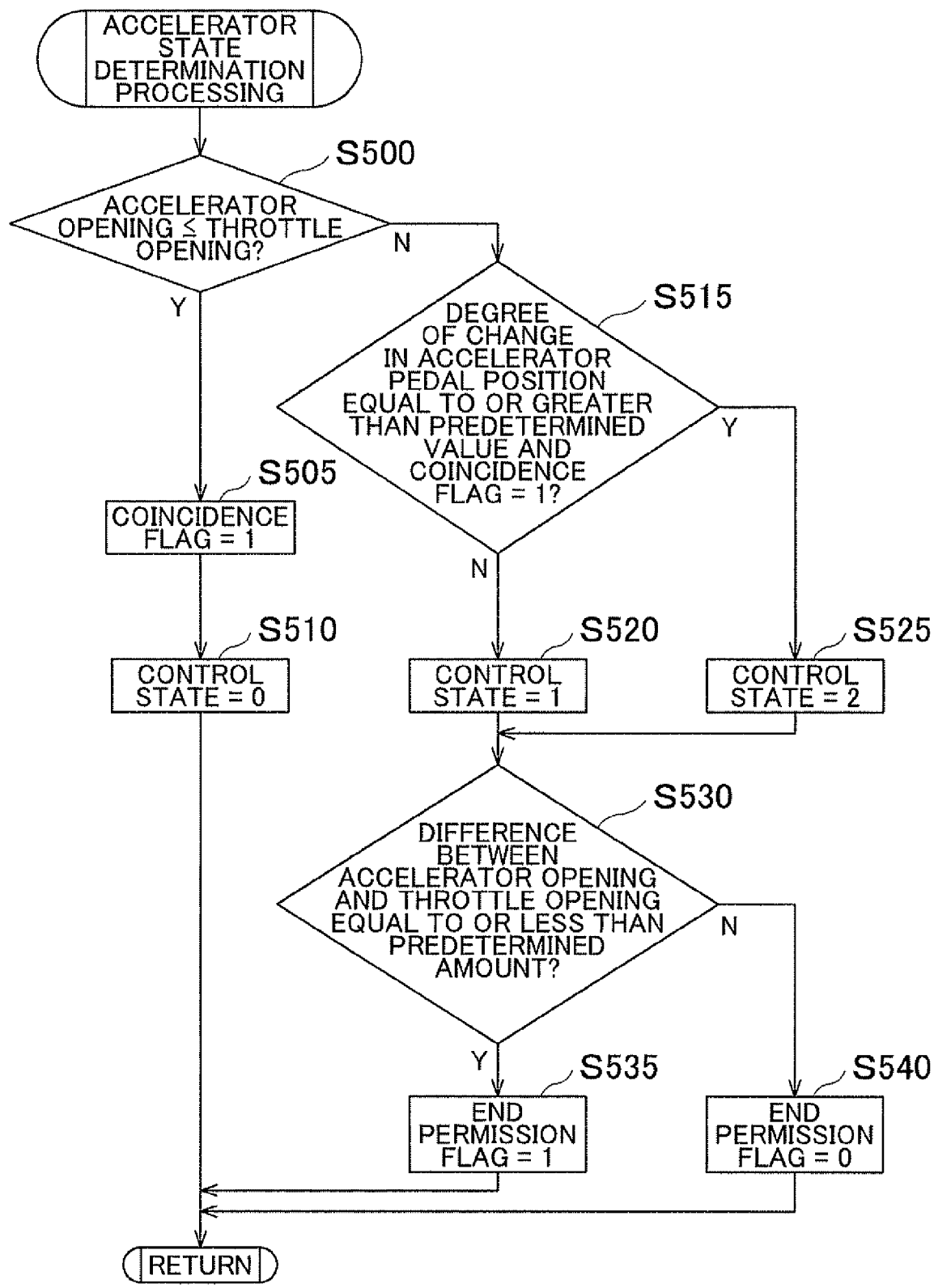
FIG. 11 is a flowchart showing accelerator state determination processing.

Next, the acceleration control processing executed at step S150 in the driving support processing will be explained using FIG. 10. First, the control unit 20 executes accelerator state determination processing (step S400). FIG. 11 is a flowchart that shows the flow of accelerator state determination processing. The control unit 20 determines whether a throttle opening (referred to as an accelerator opening below) corresponding to application of the correspondence relation of FIG. 3 with the actual accelerator pedal position is equal to or less than the actual throttle opening (step S500). If the accelerator opening is equal to or less than the actual throttle opening, then a coincidence flag is set to 1 (step S505), a control state is set to 0 (step S510). The accelerator opening becoming equal to or less than the throttle opening means, namely, that the throttle opening corresponding to the actual accelerator pedal position coincides with the actual throttle opening, and the coincidence flag is a flag for storing the fact of such a coincidence.

If it is not determined at step S500 that the accelerator opening is equal to or less than the throttle opening, then the control unit 20 determines whether a position degree of change ap of the accelerator pedal is equal to or greater than a predetermined value and the coincidence flag is set to 1 (step S515). If it is determined that the position degree of change ap is equal to or greater than the predetermined value and the coincidence flag is set to 1, then a control state is set to 2 (step S525); however, if it is not determined that the position degree of change ap is equal to or greater than the predetermined value and the coincidence flag is 1, then the control state is set to 1 (step S520). Here, the position degree of change ap of the accelerator pedal refers to an amount of change in the accelerator pedal position, as changed according to an accelerator operation performed by the driver, per unit distance (or per unit time). At step S515 the accelerator pedal position is obtained from the accelerator operation detecting unit 43, and amount of change in the accelerator pedal position per unit distance is derived. The amount of change in the accelerator pedal position is expressed as (Yp−Xp) when changed from Xp % to Yp % in FIG. 3, for example. In the driving support processing of FIG. 4, the acceleration control processing of step S150 is repeatedly executed during the time that the control zone corresponds to the acceleration zone, provided that the ignition is turned on. Therefore, a difference between the accelerator pedal position obtained at step S515 during a previous cycle and the accelerator pedal position obtained at step S515 during the current cycle (i.e., the amount of change in the accelerator pedal position) can be divided by a difference (travel distance) between the host vehicle's current position obtained during the previous cycle and the host vehicle's current position obtained during the current cycle in order to calculate the amount of change in the accelerator pedal position per unit distance. The predetermined value used in the determination of the position degree of change ap is set in advance as a threshold for distinguishing between whether the driver's accelerator operation is a sudden depression or a gradual depression. In the present embodiment, the position degree of change ap being equal to or greater than the predetermined value means that the accelerator pedal has been rapidly (strongly) depressed.

Next, the control unit 20 determines whether a difference between the accelerator opening and the throttle opening is equal to or less than a predetermined amount (step S530). If the difference is equal to or less than the predetermined amount, then an end permission flag is set to 1 (step S535); however, if the difference is not equal to or less than the predetermined amount, the end permission flag is set to 0 (step S540). Note that the predetermined amount in this case is preset as an approximate amount that does not give the driver a sense of incongruity even under circumstances where the difference of the predetermined amount is between the accelerator opening and the throttle opening and a control that increases the throttle opening using the first degree of change or the second degree of change is ended. The above section described the accelerator state determination processing. Next, the acceleration control end determination processing executed at step S405 in the acceleration control processing of FIG. 10 will be explained using FIG. 12.

Figure 12:
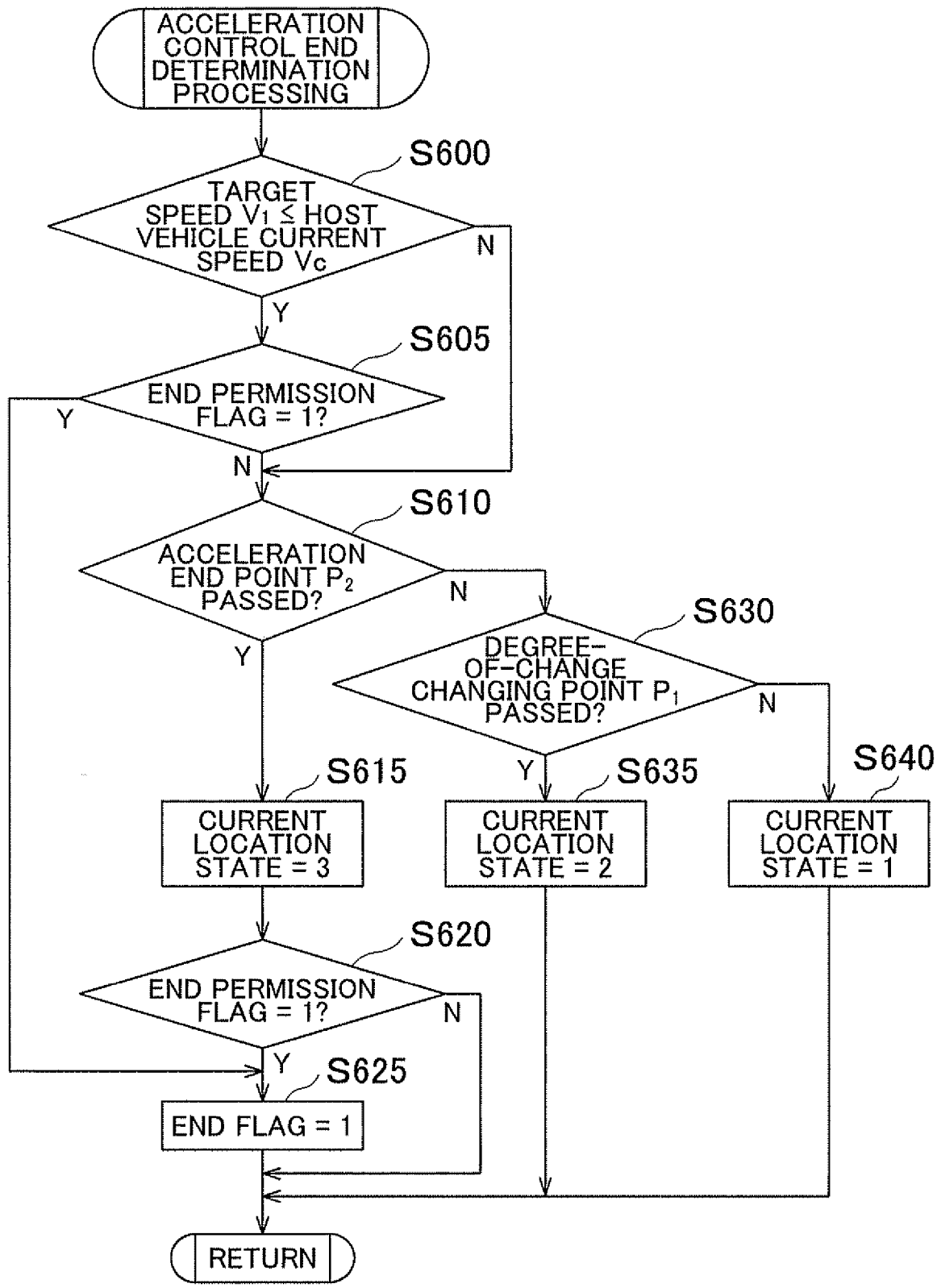
FIG. 12 is a flowchart showing acceleration control end determination processing.

FIG. 12 is a flowchart that shows the flow of acceleration control end determination processing. First, the control unit 20 determines whether the host vehicle's current speed Vc is equal to or greater than the target speed $V_1$ after the end of acceleration (step S600). If the current speed Vc is equal to or greater than the target speed $V_1$, then it is determined whether the end permission flag is set to 1 (step S605). If the end permission flag is not set to 1, then it is determined whether the host vehicle has passed the acceleration end point $P_2$ (step S610). If it is determined at step S610 that the host vehicle has passed the acceleration end point P2, then the control unit 20 sets a current location state to 3 (step S615), and determines whether the end permission flag is set to 1 (step S620). If the end permission flag is set to 1, then the control unit 20 sets the end flag to 1 (step S625). Meanwhile, if it is determined at step S605 that the end permission flag is set to 1, then the routine proceeds to step S625 where the end flag is set to 1. The end flag is a flag that, when set to 1, ends the acceleration control performed by the acceleration control unit 21e. Even if the host vehicle's current speed Vc exceeds the target speed $V_1$, if the difference between the accelerator opening and the throttle opening is larger than the predetermined amount (end permission flag=0 (step S540 in FIG. 11)), then the end flag is not set to 1 (step S620).

If it is not determined at step S610 that the acceleration end point $P_2$ has been passed, then the control unit 20 determines whether the host vehicle has passed the degree-of-change changing point $P_1$ (step S630). If it is determined that the degree-of-change changing point $P_1$ has been passed, then the current location state is set to 2 (step S635). If it is not determined at step S630 that the degree-of-change changing point $P_1$ has been passed, then the current location state is set to 1 (step S640). Namely, regarding the current location state, "1" indicates a zone ranging from after the end point $P_0$ of the reference speed zone Zb to the degree-of-change changing point $P_1$, "2" indicates a zone ranging from after the degree-of-change changing point $P_1$ to the acceleration end point $P_2$, and "3" indicates after the acceleration endpoint $P_2$.

The above section described the acceleration control end determination processing. The description of acceleration control processing of FIG. 10 will be resumed below.

Following execution of the accelerator state determination processing at step S400 and the acceleration control end determination processing at step S405, the control unit 20 determines whether the end flag is set to 1 (step S410). If the end flag is not set to 1, then the control unit 20 determines whether the control state is set to 0 (step S415). If the control state is 0, then the control unit 20 coincides the throttle opening with the accelerator opening (step S420). The control state being set to 0 means that the relation of accelerator opening≦throttle opening has been achieved at step S500 of the accelerator state determination processing in FIG. 11. In other words, the correspondence relation of FIG. 3 is applied in such case, and based on the correspondence relation, the throttle opening is set to a value that corresponds to the actual accelerator pedal position.

If it is not determined at step S415 that the control state is 0, then the control unit 20 determines whether the current location state is 1 and the control state is 1 (step S440). If the current location state is 1 and the control state is 1, then the throttle opening is set so as to increase by the first degree of change th1 (step S445). If it is not determined at step S440 that the current location state is 1 and the control state is 1, then the control unit 20 sets the throttle opening so as to increase by the second degree of change th2 (step S450). Note that regarding th1 and th2, values appropriate for the current gear ratio are respectively selected and set. FIG. 13 is a table that summarizes the correspondence among the throttle control, the set values of the control state, and the set values of the current location state, as set in the processing thus far.

Next the control unit 20 calculates an acceleration a1 acting on the host vehicle based on the current gear ratio and the content of the throttle control set at steps S420, S445, and S450 (step S425), and determines whether the calculated acceleration a1 exceeds a limit acceleration LimAd described later (step S430). If the acceleration a1 exceeds the limit acceleration LimAd, then the control unit 20 resets the throttle opening so as to increase by a throttle opening degree of change corresponding to the limit acceleration LimAd (step S435). Here, the acceleration a1 is stored in advance in the memory medium 30 in accordance with the gear ratio, the throttle opening degree of change, and the like. The control unit 20 refers to the memory medium 30 to obtain the acceleration a1 appropriate to the current gear ratio and throttle opening degree of change. In the present embodiment, the limit acceleration LimAd is expressed as $(((\mu \cdot W \cdot S)^2 - Fc(\gamma^2))^{1/2})/W$, where $\mu$ is a friction coefficient of the road surface, W is a weight of the host vehicle, S is a coefficient greater than zero but equal to or less than one, and $Fc(\gamma)$ is a function indicating a force in the lateral direction acting on the host vehicle when traveling through a road zone with the curvature $\gamma$. The road surface friction coefficient $\mu$ may be identified in advance; a pre-measured friction coefficient may be recorded in the map information 30a, or a road surface friction coefficient may be estimated and set based on the weather and so forth, or a friction coefficient may be set using probe information. Note that the weight W, the coefficient S, and the function $Fc(\gamma)$ are stored in advance in the memory medium 30, and the control unit 20 obtains such information to calculate the limit acceleration LimAd.

FIG. 14 is an explanatory drawing for describing an acceleration force Fad and a threshold LimFad (a limit acceleration force under which slip is not generated). FIG. 14 shows the host vehicle C traveling in the direction of an arrow Fw, and also shows the magnitude of a friction force $\mu \cdot W$ acting on the host vehicle C by a solid-line circle. In FIG. 14, slip is generated by the host vehicle C when an edge of a vector representing forces acting on the host vehicle C (a resultant force of the lateral-direction force $Fc(\gamma)$ and the acceleration force) exceeds the solid-line circle. In other words, by breaking down the friction force $\mu \cdot W$ into the lateral-direction force $Fc(\gamma)$ and an acceleration force acting in the forward direction of the vehicle, this acceleration force can be considered a limit acceleration force at which slip occurs.

Hence in the present embodiment, the limit acceleration force LimFad is set as a value obtained by breaking down a value $\mu \cdot W \cdot S$ found by multiplying the friction force $\mu \cdot W$ by the coefficient S that is one or less into a force acting in the forward direction of the vehicle based on a force $Fc(\gamma)$ in the lateral direction, such that a constant margin is achieved with respect to the friction force $\mu \cdot W$. In other words, as exemplified in FIG. 14, the host vehicle C is considered to have less running stability when a tip of a vector indicating the acceleration force Fad is closer to the outer periphery of the circle than a position P corresponding to a tip of a component vector of a vector $\mu \cdot W \cdot S$. The limit acceleration LimAd is expressed as the limit acceleration force LimFad divided by W, and the limit acceleration LimAd found as explained above is used at steps S430 and S435. Namely, assuming that the throttle opening has been increased by either the first degree of change th1 or the second degree of change th2, when the acceleration acting on the host vehicle exceeds the limit acceleration LimAd, the throttle opening is varied by a degree of change that corresponds to the limit acceleration LimAd. Therefore, the speed of the host vehicle can be increased using an acceleration that does not generate slip.

The control unit 20 derives the throttle opening based on the degree of change set or reset as described above, and notifies the throttle control unit 46. The throttle control unit 46 controls the position of the throttle valve based on the throttle opening communicated by the control unit 20. More specifically, since the degree of change in the present embodiment is expressed by an amount of change in the throttle opening per unit distance, the throttle opening in the previous cycle of driving support processing+(the host vehicle's traveled distance from the previous cycle to the current cycle× degree of change) is set, for example, as the throttle opening communicated to the throttle control unit 46 in the current cycle. Note that when the throttle opening is set so as to coincide with the accelerator opening (step S420), the control unit 20 communicates to the throttle control unit 46 a throttle opening that corresponds to the accelerator pedal position obtained from the accelerator operation detecting unit 43.

Further note that if it is determined at step S410 that the end flag is set to 1, then the control unit 20 sets the current location state, the control state, and the coincidence flag to 0 (steps S455, S460, and S465), and sets the control zone to "none" (step S470).

(3) Operation Example

FIG. 15 is a drawing showing an example of how the actual throttle opening (indicated by a double-dashed line) changes after the host vehicle passes the end point $P_0$ of the reference speed zone, and how the accelerator opening (indicated by a dashed line) changes due to execution of the above driving support processing. As illustrated in FIG. 7, repeatedly switching the throttle opening between 0% and Xth % in the reference speed zone Zb maintains the speed Vc at the reference speed Vreq. Consequently, as FIG. 15 shows, a difference occurs at the end point $P_0$ between the actual throttle opening (a double-dashed line) and the throttle opening corresponding to application of the correspondence relation with the actual accelerator pedal position (a dashed line).

FIGS. 15A, 15B, and 15C all show that the actual accelerator pedal position is Yp % when the point $P_0$ is passed, and that the actual throttle opening is Xth % at the same point as well (see FIG. 3). As shown in FIG. 15A, if the accelerator pedal position Yp % during passage through the point $P_0$ is maintained by the driver even after passing the point $P_0$, then the control state is 1 until the accelerator opening and the throttle opening coincide (because the coincidence flag is 0 at step S515 in FIG. 11). Therefore, while the current location state is 1, the throttle opening is increased by the first degree of change th1, and while the current location state is 2, the throttle opening is increased by the second degree of change th2. Once the throttle opening coincides (while the throttle opening coincides) with the accelerator opening in FIG. 15A, the control state is 0 and the correspondence relation of FIG. 3 is applied to the throttle opening (see FIG. 14). By increasing the throttle opening as explained above after passing the point $P_0$, the vehicle speed with respect to the depression amount of the accelerator pedal can be more gradually changed compared to when the throttle opening is increased by the second degree of change th2 immediately after passing the point $P_0$. Moreover, the actual throttle opening can more quickly approach and coincide with the accelerator opening compared to constantly increasing the throttle opening by the first degree of change th1.

FIGS. 15B and 15C show that if the driver cancels the accelerator pedal operation after passing through the point $P_0$ but before reaching the degree-of-change changing point $P_1$, then the control state is set to and remains 0 at the start and during coincidence of the accelerator opening and the throttle opening (step S510 in FIG. 11), and the correspondence relation of FIG. 3 is applied to the throttle opening. The driver is subsequently shown as resuming the accelerator pedal operation in FIGS. 153 and 15C, but the FIGS. 15B and 15C differ in that the position degree of change ap of the accelerator pedal is different following resumption of the accelerator operation. Once the throttle opening and the accelerator opening coincide, if the position degree of change ap of the accelerator pedal since the resumption of the accelerator operation is smaller than the predetermined value, then the control state becomes 1 (NO at step S515 in FIG. 11). As FIG. 15B shows, while the current location state is 1, the throttle opening is increased by the first degree of change th1, and at the point when the current location state becomes 2, the throttle opening is increased by the second degree of change th2. The position degree of change ap being smaller than the predetermined value means that the accelerator pedal is being gradually depressed.

In FIG. 15B, after passing through the acceleration end point $P_2$, the control state is 1 because the position degree of change ap of the accelerator pedal is still smaller than the predetermined value (NO at step S515). Since the current location state is 3, provided that the difference between the accelerator opening and the throttle opening is not equal to or less than the predetermined amount (step S540), the throttle opening continues to be increased by the second degree of change th2 (NO at step S620 in FIG. 12). Namely, in such case, when the acceleration end point $P_2$ is passed, even if the accelerator opening and the throttle opening do not coincide, it is possible to prevent the vehicle from rapidly accelerating despite the driver not greatly changing the depression amount of the accelerator pedal. As a consequence, no sense of incongruity is felt by the driver when passing through the acceleration end point $P_2$.

Note that, as shown in FIG. 15C, following coincidence of the throttle opening and the accelerator opening, if it is detected that the position degree of change ap of the accelerator pedal is equal to or greater than the predetermined value since the resumption of the accelerator operation, then the control state is 1 until the position degree of change ap is detected as equal to or greater than the predetermined value (NO at step S515), and the control state is 2 once the position degree of change ap is detected as equal to or greater than the predetermined value (YES at step S515). Therefore, as FIG. 15C illustrates, while the current location state is 1, the throttle opening is first increased by the first degree of change th1, and once it is detected that the position degree of change ap is equal to or greater than the predetermined value, the throttle opening is increased by the second degree of change th2.

As shown in the examples of FIGS. 15B and 15C, until the degree-of-change changing point $P_1$ is passed, the correspondence relation of FIG. 3 is not applied (control over the acceleration control is not returned to the driver) even after the accelerator opening and the throttle opening coincide, and the throttle opening is increased by either the first degree of change th1 or the second degree of change th2. Thus, from the end point $P_0$ of the reference speed zone Zb to at least the degree-of-change changing point $P_1$, it can be ensured that the vehicle does not rapidly accelerate faster than the second degree of change th2. In the reference speed zone 7b the sense of the acceleration being controlled so as not to exceed the reference speed Vreq set as an upper limit even if the accelerator pedal is depressed by a large amount may remain with the driver. If control of the acceleration control is returned to the driver under such circumstances because the acceleration opening and the throttle opening have coincided at that timing (if the throttle opening is coincided with the accelerator opening), then the driver tends to depress the accelerator pedal by a large amount, whereby the driver's accelerator operation causes the vehicle to accelerate more than the driver expected. For this reason, despite coincidence of the accelerator opening and the throttle opening before reaching the point $P_1$, control over the accelerator control is not returned to the driver. Furthermore, if the position degree of change ap of the accelerator pedal becomes equal to or greater than the predetermined value due to the driver's operation, then the throttle opening is increased by the second degree of change th2. Therefore, despite the position degree of change ap being equal to or greater than the predetermined value (i.e. the accelerator pedal being rapidly depressed), the degree of change of the actual throttle opening can more closely approach the degree of change of the throttle opening that corresponds to the change in the position of the accelerator pedal due to the driver's operation compared to when the throttle opening is increased by the first degree of change th1. Accordingly, the behavior of the vehicle can conform to the driver's sense of the depression amount of the accelerator pedal.

Note that, although the examples in FIGS. 15A, 15B, and 15C described cases in which slip are estimated not to occur at th1 and th2, naturally the throttle opening may be increased by a degree of change reset at step S435 if th2 is assumed to generate slip.

As explained above, the host vehicle is decelerated to the reference speed Vreq by the throttle control performed by the deceleration control unit 21c before the reference speed zone Zb. In the reference speed zone Zb, the host vehicle runs at the reference speed Vreq due to the processing of the reference speed control unit 21d. Once the host vehicle reaches the end point $P_0$ of the reference speed zone Zb, the throttle opening is increased as described above by the processing of the acceleration control unit 21e. In other words, following passage through the end point $P_0$, travel that does not apply the correspondence relation is ended and a switch made to travel that applies the correspondence relation. According to the present embodiment, it is possible to lower a sense of incongruity felt by the driver at such time. Namely, once the end point of the reference speed zone has been passed, a sense of incongruity that arises due to the actual vehicle behavior not coinciding with the vehicle behavior anticipated based on the depression amount of the accelerator pedal (e.g. after passing the end point of the reference speed zone, the vehicle speed rapidly changes despite no great change in the depression amount of the accelerator pedal on the part of the driver) can be lowered. As a consequence, the driver can smoothly decelerate, maintain a speed, and accelerate when traveling through the reference speed zone Zb and the roads before and after.

(4) Other Embodiments

Figure 16:
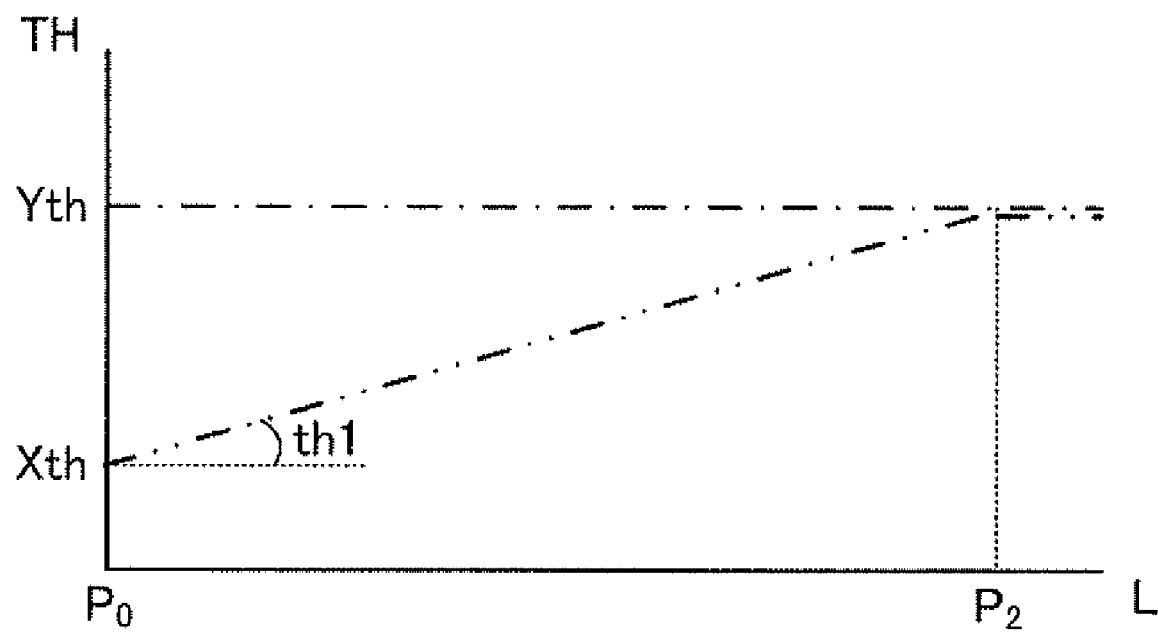
FIG. 16 is a graph showing an example of changes regarding the accelerator opening and the throttle opening.

The above embodiment is one example for carrying out the present invention; however, various other embodiments may be adopted provided that following passage through the end point of the reference speed zone, if an actual adjustment amount does not coincide with an adjustment amount corresponding to application of the correspondence relation with the accelerator pedal position, then the adjustment amount is changed by the first degree of change. In the above embodiment, an example was given where the throttle opening is increased in two stages, by the first degree of change and the second degree of change. As shown in FIG. 16, however, following passage through the end point $P_0$ of the reference speed zone Zb, the throttle opening may be constantly increased by the first degree of change th1 up to the acceleration end point $P_2$ or until the throttle opening and the accelerator opening coincide. Furthermore, the present invention is not limited to the two stages of the first degree of change and the second degree of change; the throttle opening may be increased in three or more stages. In such case, if th1<th2<th3, then a degree of change first selected after passing the end point of the reference speed zone is preferably the smallest degree of change th1.

In addition, a trigger for shifting from the first degree of change to the second degree of change may be a lapsed time since the start of changing the adjustment amount using the first degree of change (a lapsed time subsequent to passing the end point of the reference speed zone), or a travel distance since the start of changing the adjustment amount using the first degree of change (a travel distance from the end point of the reference speed zone), exceeding a predetermined value set in advance. Alternatively, the trigger may be the position degree of change of the accelerator pedal growing larger than a predetermined value set in advance due to the driver depressing the accelerator pedal.

Note that in the above embodiment, the first degree of change th1 and the second degree of change th2 used values that were set in advance in accordance with the gear ratios. However, for example, the first degree of change th1 may be dynamically calculated and set such that the vehicle accelerates at a first target acceleration (e.g. approximately 0.2 G). Likewise, the second degree of change th2 may be dynamically calculated and set such that the vehicle accelerates at a second target acceleration that is larger than the first target acceleration. Even if the throttle opening is increased by the same degree of change in the same gear ratio, the acceleration acting on the vehicle may differ due to the slope of the road, the vehicle weight, and the like. Hence, a structure may be employed in which the first degree of change th1 and the second degree of change th2 are set by a feedback control in order to obtain a targeted acceleration.

In the above embodiment, an example was given where a portion of a curve zone with a constant curvature radius R was fixedly set as the reference speed zone; however, the present invention is not limited thereby. For example, the curve zone with the constant curvature itself may be considered the reference speed zone. In addition, other zones may be used such as a road zone combining a portion or all of the curve zone with the constant curvature with roads before and/or after, a curve zone having a shape with a predetermined curvature radius or less, and a road zone with a prescribed speed limit. The reference speed zone may be fixedly set by obtaining information specifying a road shape (such as a curvature radius, a central angle of a fan shape with a predetermined curvature radius, or a length of an arc of the fan shape with the central angle) or information regarding a speed limit or the like from map information. Also, the reference speed zone may be set based on the driving habits of the driver and information specifying the road shape as learned from the driver's driving habits. For example, if a tendency to strongly depress the accelerator before reaching the end point of a constant-R curve zone has been derived as a result of learning, then the end point of the reference speed zone may be set before the end point of the constant-R curve zone based on such a result.

The reference speed may be a vehicle speed already associated with the reference speed zone, or determined based on information specifying the reference speed zone and roads before and after.

Although a degree of acceleration was employed as an acceleration amount in the above embodiment, a torque, engine output, or the like may also be used.

Note that although the above embodiment described the drive source as an engine and the adjustment amount of the drive source output as a throttle opening, various other structures may be adopted as parameters for adjusting the output of the drive source in order to drive the vehicle. For example in the case of a hybrid car or an electric vehicle, a voltage or the like applied to a motor that drives a wheel may be assumed as the adjustment amount of the drive source output.

What is claimed is:

1. A driving support device comprising:
    a control point obtaining unit that obtains an end point of a reference speed zone in which a host vehicle travels at a reference speed by controlling an adjustment amount of a drive source output of the host vehicle, without applying a preset correspondence relation regarding an accelerator pedal position and the adjustment amount of the drive source output of the host vehicle; and
    an adjustment amount control unit that, after the host vehicle passes the end point of the reference speed zone, changes the adjustment amount by a first degree of change if an actual adjustment amount and an adjustment amount corresponding to application of the correspondence relation with the accelerator pedal position do not coincide and that, after changing the adjustment amount by the first degree of change, changes the adjustment amount by a second degree of change that is larger than the first degree of change.

2. The driving support device according to claim 1, wherein the control point obtaining unit obtains an acceleration end point, based on a speed of the host vehicle when the host vehicle passes the end point of the reference speed zone and a target speed and target acceleration amount after passing the end point of the reference speed zone, and sets a degree-of-change changing point between the end point of the reference speed zone and the acceleration end point, and
    the adjustment amount control unit changes the adjustment amount by the second degree of change following passage through the degree-of-change changing point.

3. The driving support device according to claim 2, wherein the adjustment amount control unit changes the adjustment amount by the second degree of change, between the end point of the reference speed zone and the degree-of-change changing point, if the actual adjustment amount and the adjustment amount corresponding to the accelerator pedal position coincide and a position degree of change of the accelerator pedal following coincidence is equal to or greater than a predetermined value set in advance.

4. The driving support device according to claim 2, wherein the adjustment amount control unit changes the adjustment amount by one of the first degree of change and the second degree of change following passage through the acceleration end point if the actual adjustment amount and the adjustment amount corresponding to the accelerator pedal position do not coincide.

5. The driving support device according to claim 3, wherein the adjustment amount control unit changes the adjustment amount by one of the first degree of change and the second degree of change following passage through the acceleration end point if the actual adjustment amount and the adjustment amount corresponding to the accelerator pedal position do not coincide.

6. The driving support device according to claim 5, wherein the adjustment amount control unit obtains a limit acceleration amount that does not generate slip in the host vehicle, and changes the adjustment amount by a degree of change corresponding to the limit acceleration amount if an acceleration amount acting on the host vehicle when the adjustment amount is assumed to be changed by one of the first degree of change and the second degree of change exceeds the limit acceleration amount.

7. The driving support device according to claim 1, wherein the adjustment amount control unit obtains a limit acceleration amount that does not generate slip in the host vehicle, and changes the adjustment amount by a degree of change corresponding to the limit acceleration amount if an acceleration amount acting on the host vehicle when the adjustment amount is assumed to be changed by one of the first degree of change and the second degree of change exceeds the limit acceleration amount.

8. The driving support device according to claim 1, wherein the adjustment amount control unit obtains a limit acceleration amount that does not generate slip in the host vehicle, and changes the adjustment amount by a degree of change corresponding to the limit acceleration amount if an acceleration amount acting on the host vehicle when the adjustment amount is assumed to be changed by one of the first degree of change and the second degree of change exceeds the limit acceleration amount.

9. The driving support device according to claim 1, wherein the adjustment amount control unit obtains a limit acceleration amount that does not generate slip in the host vehicle, and changes the adjustment amount by a degree of change corresponding to the limit acceleration amount if an acceleration amount acting on the host vehicle when the adjustment amount is assumed to be changed by one of the first degree of change and the second degree of change exceeds the limit acceleration amount.

10. The driving support device according to claim 1, wherein
    the adjustment amount control unit obtains a limit acceleration amount that does not generate slip in the host vehicle, and changes the adjustment amount by a degree of change corresponding to the limit acceleration amount if an acceleration amount acting on the host vehicle when the adjustment amount is assumed to be changed by one of the first degree of change and the second degree of change exceeds the limit acceleration amount.

11. A driving support device comprising:
    a control point obtaining unit that obtains an end point of a reference speed zone in which a host vehicle travels at a reference speed by controlling an adjustment amount of a drive source output of the host vehicle, without applying a preset correspondence relation regarding an accelerator pedal position and the adjustment amount of the drive source output of the host vehicle and that obtains an acceleration end point based on a speed of the host vehicle when the host vehicle passes the end point of the reference speed zone and a target speed and target acceleration amount after passing the end point of the reference speed zone; and an adjustment amount control unit that, after the host vehicle passes the end point of the reference speed zone, changes an actual adjustment amount by a first degree of change if an actual adjustment amount and an adjustment amount by a predetermined degree of change so as to coincide with an adjustment amount corresponding to application of the correspondence relation with the accelerator pedal position at the acceleration end point if the actual adjustment amount and the adjustment amount corresponding to application of the correspondence relation with the accelerator position do not coincide.

* * * * *